US012536714B2

(12) United States Patent
Hamer et al.

(10) Patent No.: US 12,536,714 B2
(45) Date of Patent: Jan. 27, 2026

(54) DISPLAY WITH THREE REGIONS OF COLOR SPACE

(71) Applicant: OLEDWorks LLC, Rochester, NY (US)

(72) Inventors: John Hamer, Rochester, NY (US); Michael J. Murdoch, Pittsford, NY (US)

(73) Assignee: OLEDWorks LLC, Rochester, NY (US)

( * ) Notice: Subject to any disclaimer, the term of this patent is extended or adjusted under 35 U.S.C. 154(b) by 209 days.

(21) Appl. No.: 18/263,451

(22) PCT Filed: Jul. 7, 2022

(86) PCT No.: PCT/US2022/073498
§ 371 (c)(1),
(2) Date: Jul. 28, 2023

(87) PCT Pub. No.: WO2023/004234
PCT Pub. Date: Jan. 26, 2023

(65) Prior Publication Data

US 2024/0087183 A1 Mar. 14, 2024

Related U.S. Application Data

(60) Provisional application No. 63/223,635, filed on Jul. 20, 2021.

(51) Int. Cl.
*G06T 11/00* (2006.01)
*G09G 3/20* (2006.01)
(Continued)

(52) U.S. Cl.
CPC .......... *G06T 11/001* (2013.01); *G09G 3/2051* (2013.01); *G09G 3/2074* (2013.01);
(Continued)

(58) Field of Classification Search
CPC .. G06T 11/001; G09G 3/2051; G09G 3/2074; G09G 3/3208; G09G 5/02;
(Continued)

(56) References Cited

U.S. PATENT DOCUMENTS 7,531,959 B2 * 5/2009 Hatwar ................ H10K 50/125 313/506
7,821,580 B2 10/2010 Winger
(Continued)

FOREIGN PATENT DOCUMENTS

CN 101180889 A 5/2008
JP 2020-514807 A 5/2020
(Continued)

OTHER PUBLICATIONS

Korean Patent Office Decision to Grant Application 10-2023-7010235 (KR counterpart of U.S. Appl. No. 18/263,451) with references cited.
(Continued)

*Primary Examiner* — Said Broome
*Assistant Examiner* — Jordan Wan Yick

(57) ABSTRACT

A pixelated color display where the emission corresponds to a color space comprised of three regions: an outer boundary of the entire color space which is defined by the most saturated colors; an inner region formed by less saturated colors which is defined by an inner region boundary; and between the inner region boundary and the outer boundary, an intermediate region where at least one color is approximated by dithering between a most saturated color and a less saturated color. The dithering can be color spatial, temporal, or physical spatial dithering or combinations thereof. The display is an OLED, preferably a multimodal (white light-emitting) microcavity with a color filter array and can have 3 or more stacks of light-emitting units. The color dithering
(Continued)

in the intermediate region allows for generation of colors that cannot be emitted directly by the display.

13 Claims, 18 Drawing Sheets
(4 of 18 Drawing Sheet(s) Filed in Color)

(51) Int. Cl.
*G09G 3/3208* (2016.01)
*G09G 5/02* (2006.01)

(52) U.S. Cl.
CPC ............. *G09G 3/3208* (2013.01); *G09G 5/02* (2013.01); *G09G 2300/0452* (2013.01); *G09G 2320/0214* (2013.01); *G09G 2320/0666* (2013.01); *G09G 2340/06* (2013.01)

(58) Field of Classification Search
CPC ... G09G 2300/0452; G09G 2320/0214; G09G 2320/0666; G09G 2340/06; G09G 3/2003; G09G 3/2044; G09G 2320/0242; G09G 2340/0457; H04N 1/54; H04N 9/67
See application file for complete search history.

(56) References Cited

U.S. PATENT DOCUMENTS

| | | | | |
|---|---|---|---|---|
| 8,558,844 | B2 | 10/2013 | Goossens | |
| 9,041,724 | B2 | 5/2015 | Zeng et al. | |
| 9,363,517 | B2 | 6/2016 | Macinnis et al. | |
| 9,560,364 | B2 | 1/2017 | Wee et al. | |
| 9,569,872 | B2 | 2/2017 | Huang et al. | |
| 10,692,195 | B2 | 6/2020 | Keating | |
| 2007/0046690 | A1 | 3/2007 | Madden et al. | |
| 2007/0081719 | A1 | 4/2007 | Moriya | |
| 2008/0211973 | A1 | 9/2008 | Hekstra et al. | |
| 2009/0027898 | A1 | 1/2009 | Chang | |
| 2009/0278982 | A1 | 11/2009 | Imai et al. | |
| 2010/0207959 | A1* | 8/2010 | Qi | G09G 3/2055 345/522 |
| 2011/0285713 | A1 | 11/2011 | Swic et al. | |
| 2013/0135338 | A1* | 5/2013 | Gille | G09G 3/2059 345/596 |
| 2014/0118427 | A1 | 5/2014 | Buckley et al. | |
| 2014/0225910 | A1* | 8/2014 | Zeng | G09G 3/3466 345/591 |
| 2014/0247289 | A1 | 9/2014 | Park et al. | |
| 2016/0205372 | A1 | 7/2016 | Liu et al. | |
| 2016/0349498 | A1* | 12/2016 | Ma | G02B 26/001 |
| 2017/0091960 | A1 | 3/2017 | Wang et al. | |
| 2018/0254020 | A1 | 9/2018 | Buckley et al. | |
| 2020/0258473 | A1* | 8/2020 | Su | G09G 5/02 |
| 2021/0159462 | A1 | 5/2021 | Hamer et al. | |

FOREIGN PATENT DOCUMENTS

| | | | |
|---|---|---|---|
| KR | 1020190109552 | A | 9/2019 |
| TW | 201432665 | A | 8/2014 |
| WO | 2018/164942 | A1 | 9/2018 |
| WO | 2022039889 | A1 | 2/2022 |

OTHER PUBLICATIONS

English Translation of above Decision to Grant by applicant's KR representative.
Office Action, Taiwan Patent Office (no new references).
Office Action, Taiwan Patent Office—translation.
Office Action, Japan Patent Office (new reference highlighted).
Office Action, Japan Patent Office—translation.
Taiwan Intellectual Property Office, Office Action of Mar. 15, 2023; references therein.
Lee and Li, Attorneys-at-Law, English Translation of TIPO Office Action of Mar. 15, 2023; references therein.
European Patent Office, Extended European Search Report, Apr. 3, 2025, and references therein.

* cited by examiner

FIG. 6
REF
2L-MAP XTc 5%
2L-MAP XTc 10%
2L-MAP XTc 20%

FIG. 8
REF
3L-MAP XTc 5%
3L-MAP XTc 10%
3L-MAP XTc 20%

DISPLAY WITH THREE REGIONS OF COLOR SPACE

CROSS REFERENCE TO RELATED APPLICATIONS

This application claims the benefit of U.S. Provisional Application No. 63/223,635 filed Jul. 20, 2021.

BACKGROUND

Crosstalk in displays is where the emitted luminance provided by one pixel is unintentionally affected by another pixel. This is undesirable because the pixel affected no longer provides the exact luminance according to the image signal and so, the quality of the image can be degraded. Depending on the amount and nature of the crosstalk, important factors such as color reproduction, contrast (difference between maximum and minimum luminance), grayscale, resolution and "ghosting" in displays can all be negatively impacted.

Any and all types of displays that involve individually controlled pixels to generate an image can be affected by crosstalk to some degree. For example, crosstalk can affect image quality in LED, Quantum Dot and OLED devices. Crosstalk issues tend to be independent of display type. For example, Electroluminescent displays (ELD), backlit Liquid Crystal displays (LCD), Light-emitting diode displays (LED) including MicroLED displays, Organic Light-Emitting Diode displays (OLED), Plasma displays (PDP), Stereoscopic Displays and Quantum Dot displays (QLED) may all suffer from some degree of image degradation from crosstalk. Crosstalk issues also tend to be independent of the type of the light-generating engine in the display; for example, LED, OLED, Quantum Dots. etc. based displays can all be affected. Typically, the pixels in flat panel displays (i.e., not CRTs) are controlled either by some type of matrix addressing such as active-matrix or passive-matrix designs. Both of these designs can be subject to crosstalk issues.

In some cases, crosstalk may be due to the control circuitry of the display itself such as parasitic capacitance or residual currents. However, this tends not to be a large problem for most designs.

Not all displays suffer from the same degree of crosstalk and some types may be more prone to crosstalk issues. In particular, microdisplays (typically active-matrix devices), where the individual pixels are small and located relatively close together, are susceptible to crosstalk problems. Likewise, OLED displays, which depend on charge migration through vertically stacked organic layers, can also be susceptible to crosstalk problems due to lateral migration. A discussion of crosstalk effects in these formats can be found in Diethelm et al, "Quantitative analysis of pixel crosstalk in AMOLED displays", Journal of Information Display, 19(2), 61 (2018); Pennick et al, "Modelling crosstalk through common semiconductor layers in AMOLED displays", J. Soc. Info. Display, 26(9), 546 (2018); and Braga et al, "Modeling Electrical and Optical Cross-Talk between Adjacent Pixels in Organic Light-Emitting Diode Displays", Soc. Info. Display Digest; 50(S1), Paper 3.3 (2019).

Generally speaking, crosstalk is most visible and of highest concern for those pixels or subpixels that are supposed to have minimum or no ("black") light emission, or relatively low emission. This is because the additional unintentional light, even if small, arising from crosstalk becomes a very large percentage of overall emission compared to the low or no emission intentionally coming from the pixel. The addition of a small amount of light arising from crosstalk to a pixel with high emission should be less noticeable.

Crosstalk is also more problematic in situations where there are large differences between the emission of a pixel and pixels that are adjacent or spatially close. This could be in terms of pixels where the luminance is low or "black" (non-emitting or minimum emittance) being close to pixels where the luminance is high or at its maximum level. Crosstalk issues can also apply to situations where single color-emitting pixels (for example, a red pixel) are close to pixels emitting a different color (for example, a green pixel) even though the luminance values for both are similar. Moreover, if an unlit pixel of a different color from a neighboring lit pixel emits that different color because of crosstalk, then this will result in reduced saturation for highly-saturated primary and secondary colors.

There are two common situations where pixels with low or no emission are located near high emission pixels. The first is according to the image. It should be noted that most images are correlated; that is, pixels that are close together will most often have a similar amount of emission and so the degree of crosstalk will be relatively low within the region. For example, there will be little crosstalk in the middle of a large black patch or the middle of a large white patch. Only at edges or boundaries within the image will there be large differences in emission between pixels. Thus, correlated regions of emission may not be uniform and may be different in the center than along the boundaries due to crosstalk. The same problem occurs with correlated single-color pixels where color mixing will be more pronounced along edges and boundaries.

The second situation is a display where the emission is generated by scanning through the individual pixels as opposed to all pixels lighting simultaneously. Examples of such devices include passive-matrix and active-matrix displays. In such displays, the pixels are arranged in a matrix of columns and rows. In active-matrix displays, a data signal corresponding to the required luminance according to the image for each pixel along a particular row is created. Then, a scan line allows the data signal to pass to the pixels along that particular row, and the pixels produce the required luminance as per the data signal. Then, the data signals for the next row are generated and the scan line for the next row is activated so the pixels in the next row can create luminance. This row-by-row scanning is repeated to create the entire image and occurs within the threshold of vision to detect. However, crosstalk causes some pixels to produce light when they are supposed to be in an "OFF" state at that time.

A common problem arising from crosstalk is desaturation of highly saturated colors. In color theory, saturation (sometimes referred to as purity) refers to the chromatic intensity of a specific hue. A highly saturated hue has a vivid, intense color, while a less saturated hue appears more muted and greyer. With no saturation at all, the hue becomes a shade of grey. The saturation of a color is determined by a combination of light intensity and how much it is distributed across the spectrum of different wavelengths. A highly saturated color is one that is predominantly one color of light with minimal contribution from at least one of the other colors of light. In terms of a pixelated display, a highly saturated color is where at least one colored subpixel of the pixel will have high luminance relative to at least one other subpixel of a different color which will have low luminance. The saturated color can be a primary or a combination of primary colors (sometimes referred to as secondary colors). For example, a red subpixel can have a high luminance relative to green and blue subpixels to give a saturated red color. Alternatively, a red and a green subpixel can have a high luminance relative to a blue subpixel to give a saturated yellow color. The bigger the difference in luminance between the high and low luminance subpixels, the more saturated the color will appear. However, crosstalk can cause a subpixel with low luminance to have more luminance than desired, which will result in a less saturated (desaturated) color.

Crosstalk effects on the emitted colors from a display are only important when the effects are noticeable. ΔE (Delta E, dE) is a common measure of change in visual perception of two given colors and is often used to characterize the distance between two colors in a uniform color space such as CIELAB. The just noticeable difference (JND) of ΔE is approximately 1. In other words, if two colors have a ΔE less than 1, the difference between them is imperceivable and if larger than 1, the difference is perceivable. Unfortunately, due to the nature of human color perception and the limitations of color spaces like CIELAB, the visual perception of colors is different. That means, the same ΔE between two yellows and two greens will very likely look different. With that in mind, many ΔE equations have been developed over the years and include $\Delta E_{ab}$ (CIELAB), $\Delta E_{76}$, $\Delta E_{94}$, $\Delta E_{00}$ (CIE DE2000) and $\Delta E_{CMC}$.

Because crosstalk desaturates colors in a display, it is useful to illustrate the resulting effect on a display's color gamut. FIG. 1A shows several chromaticity gamut triangles in the CIE 1976 u'v' chromaticity diagram. The largest triangle shows the gamut of a model display system with no crosstalk, and the successively-smaller triangles show crosstalk levels of 1, 2, 5 and 10% crosstalk, in each case equal between color channels. FIG. 1B shows the same information in the a*-b* plane of the more uniform CIELAB space. The average $\Delta E_{00}$ values of each of the inner rings in FIG. 1B, relative to the outermost (no crosstalk) ring are 1.4, 2.3, 5.1, and 9.4, respectively. Thus, for this model example, a crosstalk of 1% corresponds to an average of 1.4 $\Delta E_{00}$, which is near the visual threshold for perceived color differences.

Crosstalk can be caused by both optical and chemical/electrical mechanisms. Some optical processes that can increase the amount of crosstalk include light-scattering and wave-guiding within the device. Optical cross-over can occur in any type of device that internally generates light. Specific to OLEDs with common layers across all pixels, some chemical/electrical processes that can increase crosstalk include lateral carrier migration from an active pixel area to a neighboring non-active pixel area within the same layer. This migration of charge can create voltage and current in the neighboring pixels which generates photons and leads to undesired and unintentional emission from that pixel.

It is desirable that the amount of crosstalk between pixels from all sources be 10% or less of the total amount of emission of that pixel, preferable 3% or less, and most preferable 1% or less. In terms of DE00, the color error due to crosstalk between pixels from all sources should be 10 DE00 or less, preferable 3.3 DE00 or less, or most preferably, 1.3 DE00 or less.

It is believed that there are multiple mechanisms that can result in crosstalk. Short-range modes (0.2-0.7 μm) appear to be a combination of lateral charge carrier and optical mechanisms. Medium-range modes (3-7 μm) interactions appear to be primarily due to lateral charge carrier migration but can be due partially to optical mechanisms. Long-range modes (50-200 μm) interactions appear to be primarily due to light-scatter from an active pixel area to a non-active area. It is also believed that there is an even longer-range optical contribution to crosstalk based on wave-guiding according to the pixel pitch.

Some useful methods to minimize the problem of crosstalk due to optical processes within a display device include:

The use of pixel definition layers, scattering layers or other types of optical barriers or structures between pixels that helps to restrict light travel to within the pixel and minimize light travel across different pixels. For example, see US2021/0151714; US2014/0103385; US2020/0388658; U.S. Ser. No. 10/483,310B2, US20170038597A1; US20190056618A1; CN110416247A CN106783924; CN107346778 and CN110429196A In devices with a color filter array (CFA), optimized color filters to reduce light wave guiding between the air/glass interface and the reflective anode, including the use of optical filtering layers specifically designed to absorb light traveling at high angles from the substrate normal direction. For example, see US20160065914. In addition, the use of a black matrix can reduce the off-angle emissions generated in one pixel that would have exited through the color filter of a neighboring pixel generating crosstalk.

Light-scattering reduced by reduction in scattering sites. In particular, the amount of small particle debris on or near the bottom electrode should be minimized. Scattering can also occur from roughness in the cathode or anode which can depend on the composition and process used for deposition (for example, see Shen et al, "Efficient Upper-Excited State Fluorescence in an Organic Hyperbolic Metamaterial", Nano Lett., 18 (3), 1693-1698 (2018)).

The overall electrode surfaces should be as flat and smooth as possible over both the active pixel areas and between the pixels. In particular, it is known that protrusions, humps or other structures that form a PDL (pixel defining layer) between the pixels and extend above the surface of the anode within the pixel area, can be useful for scattering light back into the pixel area and prevent it from entering a neighboring (unlit) pixel. However, this approach is not as effective when thicker OLED layers that overlay the structures are present. Light trapped within the thicker layer is more likely to be internally reflected within the layer so that it can travel over the structure to the other side. If the electrodes and OLED layers are uniformly flat, light that is wave guiding within the layers of the display is more likely to continue uninterrupted until it is absorbed or reaches the edge of the display.

The use of interlayer absorbers for wave-guided light.

Light absorption by the dielectric of the backplane.

Some useful methods to minimize the problem of crosstalk due to carrier migration in the OLED device include:

The afore-mentioned use of pixel definition layers, trenches, separators, dividers or other types of physical barriers or structures between pixels that helps to restrict carrier migration within the originating pixel and minimize any carrier migration to a different pixel.

The use of a ground plane beneath the segmented anodes of an OLED. For example, see U.S. Ser. No. 10/128,317.

Lateral charge carrier migration reduced by changing layer thicknesses and composition (to increase "sheet resistance") in layers with high carrier mobility (for example; HILs, HTLs, CGLs, ETLs and EILs). In particular, charge carriers (either holes or electrons) are generated within an active area and can move laterally across the gap between the lit area and the unlit area. This problem appears to occur primarily in layers next to or near one of the electrodes. In some cases, CGL (charge generation layers) can also contribute since they have very high carrier mobility. It is believed that the common HIL and HTL layers over the anode may be the largest contributor to the problem. It appears that once the holes are generated in the energized area of the HIL on one anode pad, they can migrate to a neighboring anode pad and the resulting voltage due to the holes can exceed the threshold voltage $V_{th}$ of the OLED and so the (nominally unlit) pixel emits light without regard to the image signal for that pixel. In addition, the charges can enter the conductive anode pad as electrons and flow laterally through the anode with very little lateral resistance. At the far side of the anode pad, the current can pass back into the HIL (as holes) for the jump to the next unlit anode pad. Thus, the problem of carrier migration may not just be limited to a shorter distance between adjacent anode pads, but could have a longer distance component as well. For this reason, careful attention should be paid to the thickness and composition of both electrodes and in particular, the anode. Thinner organic layers with less carrier mobility help to minimize these undesirable carrier migration processes. For example, see US20170317308A1.

Reduce lateral charge carrier migration by modifying the layer to have higher resistance in areas between the electrode segments. For example, see US20201772651.

Material choice for the organic layers with high carrier mobility. In particular, materials may be selected to minimize their contribution to crosstalk. The type and level of p-dopant (for example, F4-TCNQ, F6-TCNNQ or HAT-CN) added to the HIL may be important in this regard as well as the choice of HTM (for example, aromatic amine compounds such as NPB or spiro-TTB) in the HIL or HTL. P-dopant only or non-doped HIL may also be effective. In some cases, a non-doped HIL and a p-doped HTL can be used. Inorganic HIL materials such as $MoO_3$ (which may be mixed with organic materials) may also have advantages. For example, see US20170330918A1; US20170301864A1; and US20170301861A1.

In OLEDs, design of the HIL and anode to create a barrier for charges from the HIL to enter the anode is advantageous.

One method for the reduction of crosstalk is by compensation of the driving signal. The original image signal may be adjusted to compensate for differences in light emission by each pixel due to crosstalk so that the desired emission is achieved. However, this requires that the amount of crosstalk present in each pixel in each image be predictable and the image signal be recalculated for each image frame. This greatly increases demand for computation as well as overall computation time. This increases the cost of the device as well as affects response time. In such an approach, there may be parts of the color space in the areas of high color saturation that cannot be reproduced by displays relying solely on this method. In general, color management approaches that compensate the driving signal for device-specific primary chromaticity will be limited to compensating colors that are within the XT-limited display gamut.

Another method of reduction of crosstalk is to prevent emission from pixels due to crosstalk in pixelated display devices by removing or dissipating any voltage or current being supplied to the light-generating portion of a pixel whenever the pixel is supposed to be in an "OFF" or minimum emission state. While such a solution could be applied to any kind of display, it would be particularly suitable when applied to any kind of OLED display, and even more desirably, where the OLED is a multimodal (white) OLED used in combination with a color filter array. This is because the common layers in the multimodal OLED allow carrier migration from one "ON" pixel to another neighboring pixel, which might be "OFF", thus creating enough voltage in the neighboring "OFF" pixel to cause emission. This is particularly pronounced in thicker OLED structures such as microcavity structures because the layers in a microcavity OLED are necessarily thick (in order to create the microcavity) which promotes lateral carrier migration, and for multimodal OLED displays with 3 or more stacks of light-emitting units, because of high voltages required to drive these multistack OLEDs. This also applies to OLED displays with individually deposited R, G and B emissive materials within the designated pixels, but where all pixels share a common OLED layer.

Many solutions to the problem of crosstalk involving the pixel control circuitry have been proposed. For example, U.S. Pat. No. 10,665,161; US20100091001A1; U.S. Pat. No. 8,035,580; CN107134257B; U.S. Ser. No. 10/665,161B2 U.S. Pat. No. 9,324,264B2; US20030112205A1; US20200066815 and US20180180951 as well as Lin et al, "UHD AMOLED Driving Scheme of Compensation Pixel and Gate Driver Circuits Achieving High-Speed Operation", J. Elec. Devices Soc., 6, 26 (2017); Kimura et al, "New pixel driving circuit using self-discharging compensation method for high resolution OLED micro displays on a silicon backplane", J. Soc. Info. Display, 25(3), 167 (2017); Kwak et al, "Organic Light-Emitting Diode-on-Silicon Pixel Circuit Using the Source Follower Structure with Active Load for Microdisplays", Japanese Journal of Applied Physics, 50, 03CC05 (2011) all describe various pixel circuits in which excess or unwanted charge at the pixel electrode can be discharged. This prevents any unintended emission (i.e., from crosstalk) from a pixel by bleeding any electrical charge away from the OLED layers.

The above methods based on using the controlling circuits to prevent emission from non-emitting pixels are best applied to the most saturated colors that the display is capable of producing. For example, in a RGB pixel system, the most saturated color possible would be where at least one of the primary R, G, or B subpixels is non-emitting according to the image signal. However, such circuit-based methods would be more difficult to apply to colors where at least one subpixel would have at least some small (non-zero) amount of emission according to the image. In this case, it would be necessary to determine if any excess (non-intentional) amount of emission was present (for example, due to crosstalk) and make the necessary adjustments to the charge at the subpixel electrode. This would be very difficult and expensive to accomplish in practice.

However, application of a method of crosstalk reduction only to the pixels that are required to emit the most saturated colors (where at least one subpixel is turned "OFF") would still have advantages since it would enable the display to emit the most saturated color possible even if less saturated colors are still affected by crosstalk. A situation where highest saturated colors of an image have no or reduced crosstalk while others of the same hue are degraded due to crosstalk effects will result in a gap or discontinuity in the range of colors that can be emitted.

Co-assigned WO2022/039889 describes a pixel control circuit which prevents emission whenever the data signal indicates that the pixel should be non-emitting in order to reduce crosstalk.

U.S. Pat. No. 10,692,195 describes a method of hue-preserving gamut mapping from an input gamut to a less-capable output gamut. In particular, this reference describes an intermediate color space (example: IPT) with hue uniformity to do a mapping of brightness and saturation. It discloses using an intermediate color space chosen for its hue uniformity and mapping luminance and chroma at constant hue.

US 2007/0081719 describes a method for changing the number of colors between input and output (for example, RGB to RGBC) where some colors fall outside of one of the color regions subdivided from the device color space. A color conversion method is described as using multiple polyhedra using combinations of 3 primaries, representing the desired color in each using an inverse 3×3 matrix and finding which are in gamut [0,1] with resulting computation of RGBC values based on these rules.

U.S. Pat. No. 9,041,724 B2 describes temporal dithering of black & white primaries for colors in the neutral region of color space; defining neutral region within some distance of the black/white line and focuses on improved temporal stability and accuracy of using "virtual primaries" as mixes of black/white rather than chromatic primaries when rendering near-neutral colors.

U.S. Pat. No. 9,569,872 describes rasterization of computer graphics primitives where the primitive is subdivided where color discontinuities exist, so that the sub-primitives use continuously changing colors. The size is selected as a function of the color change derivative over spatial dimension and is relevant to vector drawings that include smooth gradients of color.

U.S. Pat. No. 9,560,364 describes a method of handling quantization of image pixel data that sets aside a small number of "special" pixel values, on the basis the degree of quantization error for special processing.

U.S. Pat. No. 9,363,517 discloses an efficiency-oriented memory of recently-used color index values, and a method to decide whether to reuse previously-used indices based on color difference.

U.S. Pat. No. 8,558,844 describes a method where the colors of pixels of images or "assets" may be changed to replacement colors when similar enough to the original colors. Examples refer to 3D avatars composed of multiple assets that each might be associated with a limited color palette.

U.S. Pat. No. 7,821,580 discloses a color processing system that adjusts a set of colors differently from the rest of an image's pixels (which are presumably left undistorted). Examples include increasing saturation of most colors in an image while leaving the skin tone colors alone.

None of the above methods are suitable for a display where there is a gap or discontinuity between the most saturated colors and less saturated colors that a display can emit using any combination of subpixels. Such gaps in color space can cause undesirable image and color artifacts in the displayed image. In such cases, it is desirable for the display to be able to produce at least some colors that fall within the gap.

SUMMARY

Some important features of the invention include, but are not limited to: A pixelated color display where the emission corresponds to a color space comprised of three regions: an outer boundary of the entire color space according to the most saturated colors; an inner region formed by less saturated colors which has an inner region boundary; and between the inner region boundary and the outer boundary, an intermediate region where at least one color is generated by dithering between a most saturated color and a less saturated color. The pixels can have at least three subpixels, preferably RGB or RGBW.

The above display where the pixels emitting colors at the outer boundary have reduced crosstalk compared to pixels that emit colors at the inner region boundary or within the inner region. Any of the above displays that includes an image controller that determines if a pixel has at least one subpixel that has an image signal for no emission, then reduces or prevents emission from that subpixel. One suitable mechanism of reduction or prevention of emission can involve controlling the potential at the bottom electrode of the OLED electrode.

Any of the above displays which are an OLED display, preferably an OLED microdisplay. The OLED can be a multimodal (white light-emitting) microcavity with a color filter array and can have 3 or more stacks of light-emitting units.

Any of the above displays where the colors within the intermediate region are generated by dithering between a most saturated color (where at least one subpixel has no emission according to the image signal or is below a luminance threshold) and a less saturated color (where all subpixels have an emission above a luminance threshold). The luminance threshold can be zero (no emission). Preferably, the dithering is between the most saturated color along the outer boundary and a less saturated color. It is preferable that the most saturated color and the less saturated color lie on the same hue axis.

Any of the above displays where the dithering is a spatial dithering method involving color mapping of a color within the intermediate region to either the outer boundary of most saturated colors or the inner region boundary of the inner region, desirably along the same hue axis.

Any of the above displays where the dithering involves generating intermediate colors in the intermediate region between the inner region and outer boundaries by combining pairs of colors that lie on the inner region and outer boundaries. The intermediate colors can be generated by combining different ratios of the inner and outer color (equivalently, the less-saturated and more- or most-saturated color) according to the image signal.

Any of the above displays where the dithering is temporal dithering, in which colors are combined in a pixel by alternating between them in a pattern over time. One method of temporal dithering is where the color is generated by emitting the most saturated color of the outer boundary for some period of time during the frame time and emitting a less saturated color (in particular, the color on the inner region boundary) for the remainder of the frame time. The control of the relative frame time for the more or most saturated color and the less saturated color can be determined according to the image signal. Another method of temporal dithering is where the most saturated color and the less saturated color are emitted in alternating frames or alternating (some number of frames for one) and (some number of frames for the other). Another method of temporal dithering is by varying the overall frame rate while the crosstalk reduction is enabled for a fixed time for all frames. Any of these temporal dithering methods can include where neighboring pixels are out-of-phase with each other.

Any of the above displays where the dithering involves spatial dithering, in which colors are combined in a spatial neighborhood of pixels by placing them in a spatially alternating pattern. Individual pixels in a spatial neighborhood can be distributed to the inner region and outer boundaries (equivalently, to less-saturated and more-saturated colors) according to the image signal, using a spatial arrangement that may be patterned or randomized. A patterned arrangement can be designed to have a spatial ratio of each type of pixel, for example alternating in a checkerboard. A randomized arrangement can be generated by accumulating a color error over neighboring pixels, as in error diffusion.

Any of the above displays in which intermediate colors are generated involving a combination of different types of dithering. In one combination method, at least one intermediate color is generated by temporal dithering over a selected number of units of time or subframes, and at least one other intermediate color is generated by spatial color dithering by color mapping the other color to either the outer boundary of most saturated colors, the inner region boundary or the intermediate color generated by temporal dithering.

A method of improving the available color space of a display; where the color space comprises three regions: an outer boundary of the available color space according to the most saturated colors; an inner region formed by less saturated colors which has an inner region boundary; and between the inner region boundary and the outer boundary, an intermediate region, in which intermediate colors are generated by dithering between a more- or most-saturated color and a less saturated color. The method can be applied to any display where there is gap or discontinuity in the color space. The gap can be caused by the display not being capable of emitting colors between a most saturated color and a less saturated color.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8 illustrates the effect of varying levels of crosstalk on simulated images, where dithering has been used to map colors within the intermediate region to the inner region boundary, outer boundary, or an intermediate level between.

Figure 1A:
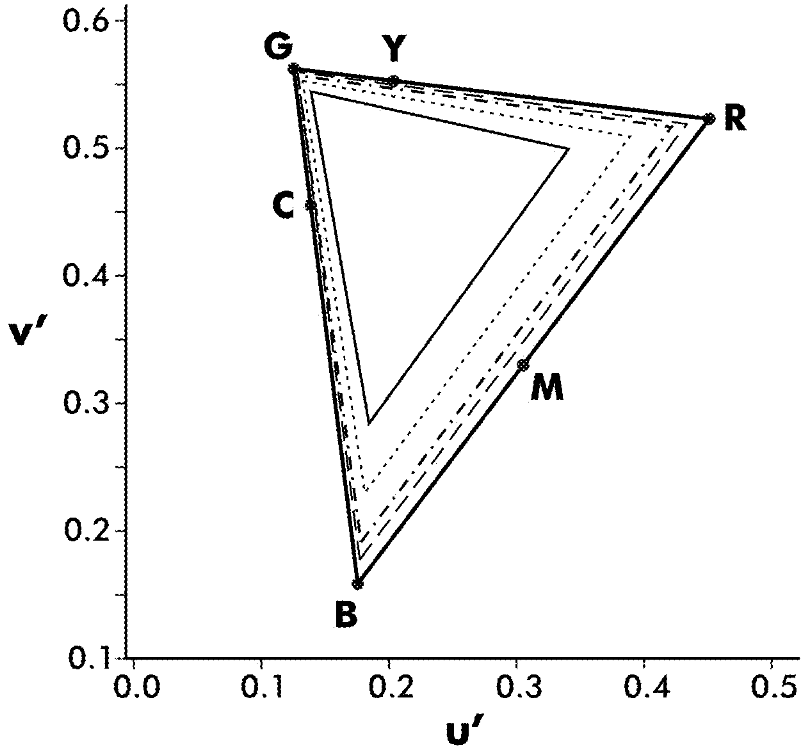
FIGS. 1A and 1B illustrate examples of color gamut reduction caused by crosstalk as a function of the level of crosstalk.

All images used in the Figures are from the public domain. (Shirley image public domain Eastman Kodak. Car photo CC license by Josh Mormann: www.flickr.com/photos/noego/165266135/in/photostream/. Flag photo CC license by Benson Kua: https://commons.wikimedia.org/wiki/File:Rainbow_flag_breeze.jpg.)

DETAILED DESCRIPTION

A display is a device for creating an image. An image may be reproduced by spatially dividing it into individual sections (pixels) that are small enough to fall below the resolution limit of human vision. The image is then created by having each individual pixel produce the appropriate amount of luminance and color for a period of time. For images that are not static, the individual pixels must be updated with new information regularly. The period of this update is the frame rate. In order to avoid the appearance of flicker, frame rates are generally faster than can be perceived by the human visual system. The display generally contains an image controller which converts the image source data into the appropriate image signals for the pixels as well as control circuitry which sends an image signal to the individual pixels to generate the image. Examples of image controllers are well known in the art.

A pixelated display has discrete pixels where each pixel comprises at least two, preferably three or more spatially correlated subpixels, each of which is independently operated and produces a different color at the desired luminance (emission) level. The emission from the subpixels is combined together by the human visual system to generate the desired colored emission from the pixel. A common system for a pixelated device uses R, G, and B subpixels, although other systems based on subpixels using different colors or number of colors are known. Some pixelated devices use four subpixels, RGB and W (RGBW).

The range of colors that can be produced by a display can be characterized in terms of a color gamut, which includes all of the colors that can be generated by the display. A color gamut can be described in a color space, which is typically defined by a specific color model or system that describes colors as numbers, typically as coordinates in a 2- or 3-dimensional space. For displays, some color spaces are described as additive where various primary colors (i.e., RGB) are mixed together to form other colors. Common color spaces and color models are CIE 1976 u'v', CIE 1931 xyz and CIE 1931 XYZ, CIEUVW, CIELAB and CIELUV. Other color space models include sRGB, Adobe RGB, Wide-gamut RGB color space, Rec. 2100, ProPhoto RGB, scRGB, DCI-P3, Rec. 709, Rec. 2020, Academy Color Encoding System (ACES), YCbCr, YUV, YCoCg, ICtCp, HSV, HSL, LCh, IPT, CIELChab and CIELChuv. All of these color space models, as well as others, can be used to describe the color gamut of a display. The color gamut of a display, when described in a color space model, is sometimes referred to as the display's color space.

In a 2-D representation of color space (for example, a chromaticity diagram), the outer boundary of a display's color space is determined by the most saturated primary colors possible which includes mixtures of two or more, but not all, of the primaries. All other colors will lie within the outer boundary of the color space. A primary color is one that only contains a single color of light, for example red, green, or blue. A most saturated color is one that is lacking at least one of the primary colors used in that color system. A secondary color is a mixture of two primary color but is lacking the other(s). The outer boundary determines the chromatic size of the color space that can be produced by a display.

In a 2-D representation of color space (for example, a chromaticity diagram) all colors of the same hue (proportion of the components in any particular color) should theoretically lie along the same line from the white point (a neutral color, or one of equal color proportions) near the center to the outer boundary of the color space. This is called a hue axis. Note that in a chromaticity diagram, the same 2-D coordinates can refer to multiple colors of different luminance, because the luminance dimension is not represented on the diagram; with this in mind, the concept of a hue axis as a line may be more generally expressed as a plane determined by white, black, and a highly-saturated color (which may also be visualized in a 3-D color space). The colors represented by the points along the hue axis nearest the white point are less saturated and the saturation increases as the points move towards the outer boundary. The point at which the hue axis intersects the outer boundary is the most saturated color that is present in the color space. In a 3-D color space, the outer boundary may be a complex polygon, defined by the locus of points that are most saturated for a set of luminance and hue combinations Note that in practice, not all of the colors along the hue axis in a color space may visually remain a constant hue, due to errors in the color space models which provide a simplified representation of human visual color sensitivity, Depending on the display or type of color space, the hue axis which corresponds to a constant visual hue may not take the form of a straight line from the white point of the color space to a particular point on the outer boundary. Such factors may be accounted for by the image controller and appropriate corrections may be incorporated in the display signals. The hue axis may be approximated as in a chromaticity color space, or preferably in a more perceptually accurate color space such as CIELAB or IPT.

However, in a pixelated display (such as one using RGB), the most saturated color the display is capable of producing on a given hue axis is typically less than the theoretical most saturated color. This is in part because an individual subpixel is generally not capable of producing a "pure" single color of light, but will be contaminated with small amounts of the other colors. This is an inherent limitation due to the emission profile of the various subpixels in the display. Thus, the 'most saturated color' that a particular display is capable of emitting in the absence of any crosstalk effects will depend on the emission characteristics of the subpixels that make up the display.

The presence of crosstalk can further decrease the color saturation available to a display. Highly saturated colors should have at least one subpixel with little or no emission. Crosstalk can increase the amount of emission from these subpixels without regard to the image signal sent to the subpixel. This has the effect of decreasing color saturation since the color becomes less pure due to the increased level of an unwanted color. The greater the amount of crosstalk (and the more unwanted emission from that subpixel), the lower the color saturation that the display is capable of producing.

Figure 2A:
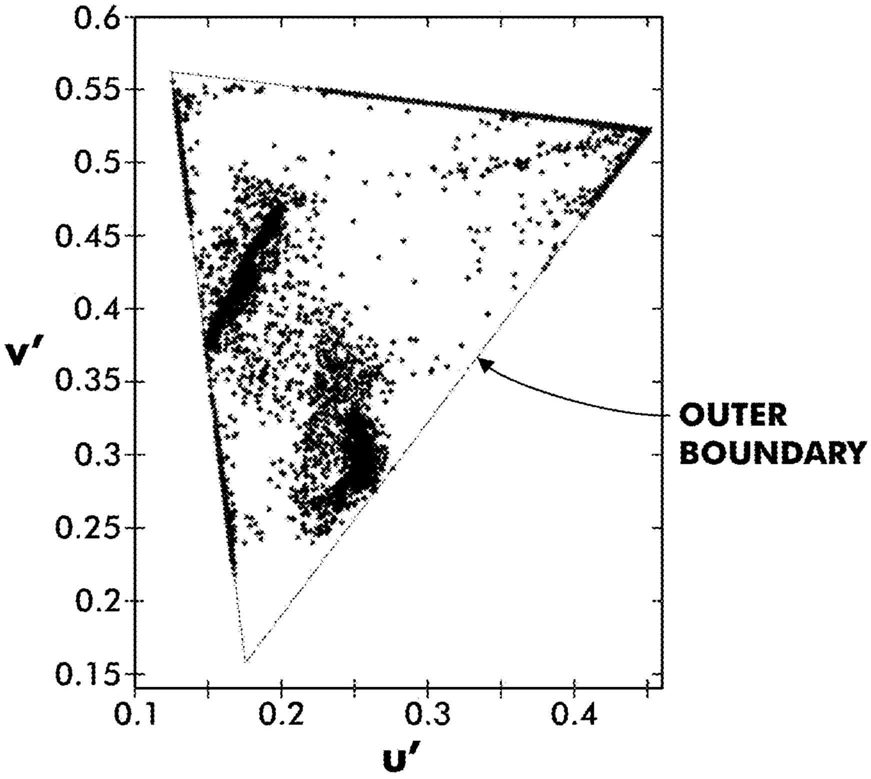
FIGS. 2A and 2B show the effects of uncorrected crosstalk on image pixels in a color space as CIE 1976 u'v' chromaticity plots.
Figure 2B:
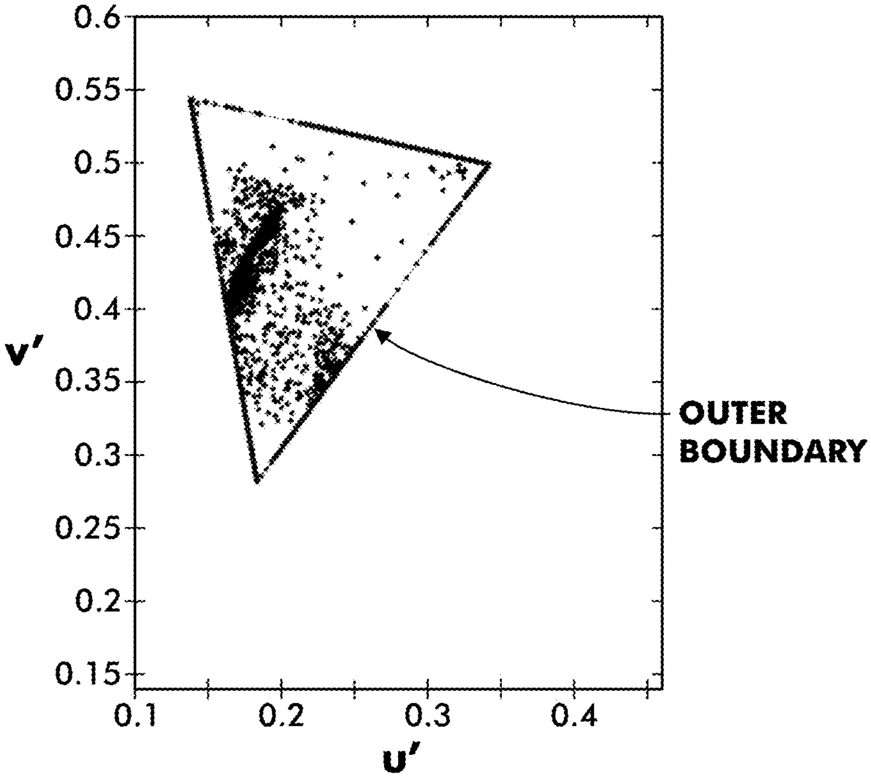

The color desaturation caused by crosstalk is undesirable since the image to be displayed can be severely degraded. This is illustrated in the series of modelled color spaces shown in FIGS. 2A-2B which shows effect of crosstalk on the color space of a display. A sampling of image pixels (from the uppermost flag image shown in FIG. 3) are plotted as dots in the CIE 1976 u'v' chromaticity space. FIG. 2A shows the pixel chromaticities of a reference color display, indicating a color-accurate image with zero crosstalk, which fit neatly into the display's color space, bounded by an outer boundary. FIG. 2B shows the effect of crosstalk, where the display's color space, or range of available chromaticities, is enclosed by its outer boundary, which is different than the outer boundary in FIG. 2A. The available color space for the display in FIG. 2B (with crosstalk) is considerably smaller.

Crosstalk in a display, in which some portion of each of the R, G, and B intensity is lost to the two other channels, may be modeled by multiplying linearized RGB values by a 3×3 matrix with weak off-diagonal terms. For example, 10% crosstalk can be shown as:

$$\begin{bmatrix} R \\ G \\ B \end{bmatrix}_{XT} = \begin{bmatrix} 0.8 & 0.1 & 0.1 \\ 0.1 & 0.8 & 0.1 \\ 0.1 & 0.1 & 0.8 \end{bmatrix} \begin{bmatrix} R \\ G \\ B \end{bmatrix}$$

Images can be simulated using a matrix of this form while correctly dealing with nonlinear encoding (also known as gamma encoding) as is familiar to one skilled in the art. For images encoded in a known encoding, such as sRGB, linear RGB values affected by simulated crosstalk can be further converted to CIE 1931 XYZ tristimulus values, xyz chromaticity values, or CIE 1976 u'v' chromaticity values for plotting or additional computation.

Figure 3:
FIG. 3 shows the effects of varying levels of uncorrected crosstalk on simulated images using the color spaces according to FIGS. 2A-2B.

FIG. 3 shows the effects of crosstalk on simulated images. The top row of images is a reference, indicating a color-accurate image with zero crosstalk (as in FIG. 2A) followed by images in subsequent rows with levels of crosstalk (XT) of 5%, 10%, and 20% as labeled. In fact, FIG. 2A shows the chromaticity coordinates of a sampling of pixels from the flag image in the top row of FIG. 3. The images in FIG. 3 get progressively desaturated because there is no compensation for the crosstalk and the color processing incorrectly treated the display as if its primaries (which are all degraded because of the presence of crosstalk) were the same as in the reference (with no crosstalk present).

When the image calls for a pixel to display the most saturated color available, at least one subpixel of that pixel will be turned "OFF" so that it is non-emitting. If crosstalk is present, then some emission will be generated from the "OFF" subpixel and the color emitted will become less saturated. It is possible that the control circuitry can be used to reduce or prevent emission from "OFF" subpixels in the most saturated colors even in the presence of crosstalk, at least in displays so equipped.

However, although very effective at increasing the ability of the display to generate the most saturated colors (where at least one subpixel is "OFF"), reducing or preventing crosstalk only for subpixels which are "OFF" has two limitations. First, it does not affect the crosstalk due to any non-electrical effects (i.e., optical crosstalk). Secondly, it cannot be applied to colors where all of the subpixels are "ON" to some degree and none are totally "OFF". In particular, colors which are saturated, but not the most saturated possible, will have at least one subpixel with some low degree of emission necessary to generate the required level of saturation for that pixel. The control circuitry should not prevent emission from that subpixel since some emission is necessary (according to the image signal) and so crosstalk cannot be reduced or eliminated in such situations. Because the crosstalk can cause additional emission from this subpixel, the saturation of the color emitted becomes limited by the amount of crosstalk. In particular, without any correction due to crosstalk in other than the most saturated colors, the available color saturation is, at best, limited to by the amount of emission due to crosstalk in the least emitting subpixel.

Figure 4:
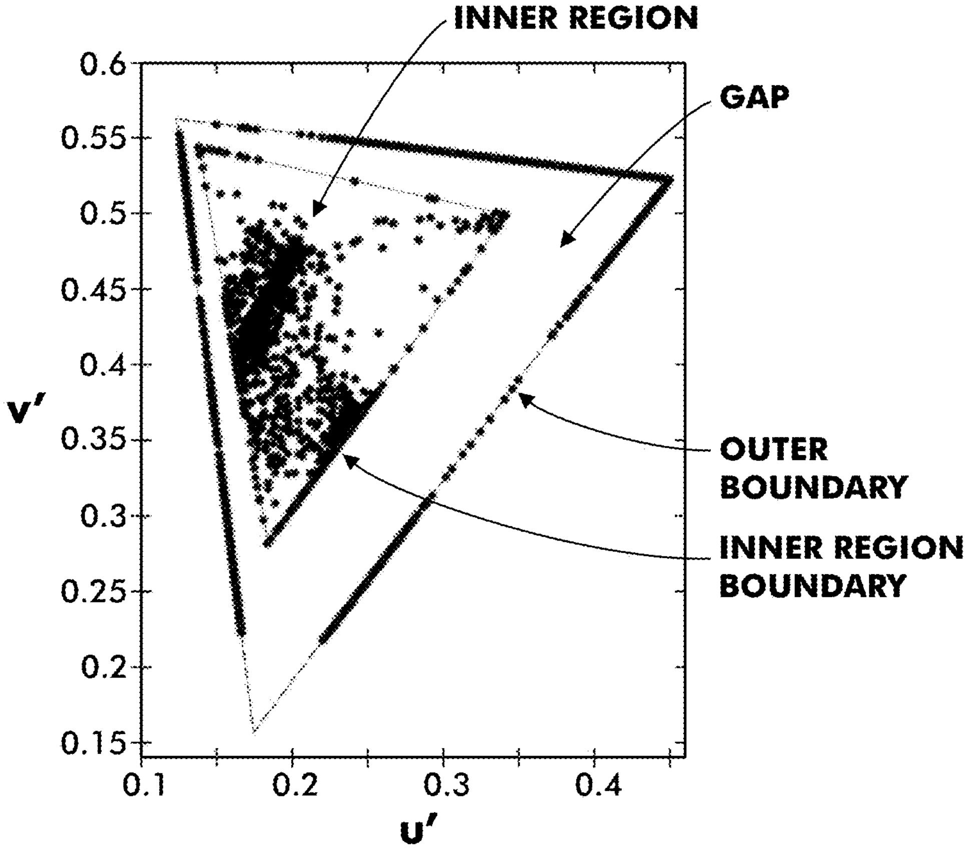
FIG. 4 shows the effects of corrected crosstalk on most saturated image pixels in a color space as CIE 1976 u'v' chromaticity plots.

FIG. 4 illustrates the effect on the color space of the same display shown in FIGS. 2A-2B where crosstalk is eliminated in pixels for which the image requires a most saturated color (i.e., a pixel where at least one of the subpixels is turned "OFF") but not in other less saturated colors. Pixels that emit less saturated colors can arise from two situations. The first situation is where, although the image signal calls for at least one subpixel to be "OFF", crosstalk is still present and has not been eliminated in that specific pixel. The second situation (which is more common) is where, according to the image signal, all of the subpixels in that pixel will have at least some emission but where the emission of at least one subpixel is near, but slightly above the minimum emission. Because crosstalk is prevented for the most saturated colors along the outer boundary, the pixels along the outer boundary are the same as in FIG. 2A. However, because crosstalk effects remain present in pixels for which the image requires less saturated colors, the available color space for these pixels with crosstalk is reduced to an inner region with an inner region boundary (as in FIG. 2B). Thus, crosstalk reduction only for the most (or very highly) saturated colors, by various methods cited above, allows for the overall size of the available color space of the display to be maintained, which is highly desirable. However, a gap or discontinuity in color space is created because crosstalk is still present in other less saturated colors, either due to the image signal or because crosstalk is still present. The colors within this gap cannot be directly generated by the displays.

For illustration, consider a RGB display in which the image calls for one pixel to emit the most saturated possible red color, another pixel to emit a highly saturated (but less than the most saturated) red at the same luminance level, and a third pixel to emit a red color of still lower saturation at the same luminance level. In this case, a signal is sent to the first pixel to emit with an R:G:B ratio of 100:0:0; a signal is sent to the second pixel to emit with an R:G:B ratio of 90:5:5; and a signal is sent to the third pixel to emit with an R:G:B ratio of 60:20:20. Note that because each R, G, and B subpixel is capable of a different maximum luminance, these R:G:B ratios are not the same as the absolute intensity requested of each subpixel, but are simplified to show that all three examples have the same overall luminance, but with different saturation. Now consider a similar display where crosstalk causes an additional 5% crosstalk between subpixels; effectively, emission in each of the low emission subpixels increases, while high emission subpixels are relatively unaffected by crosstalk. In this case, assuming the signals sent to the pixels are the same and crosstalk is constant and additive between subpixels, the first pixel now has a RGB emission ratio of 90:5:5; the second pixel has a ratio of 82:9:9 and the third has a ratio of 56:22:22. Because of the crosstalk, color saturation is decreased in all three example pixels.

Now consider a similar RGB display for which crosstalk has been eliminated but only for the most saturated color where at least one of the subpixels has zero emission, but not for other, less saturated colors. In this case, the first pixel will still have a ratio of 100:0:0 (as for the original display with no crosstalk). However, because crosstalk has not been eliminated for colors less than the most saturated colors, the second and third pixels will still have a ratio of 82:9:9 and 56:22:22 where 5% crosstalk persists between subpixels. In this case, there is a gap or discontinuity in the ability of the display to emit colors between (the most saturated color without crosstalk) and (a less saturated color with crosstalk).

In any display capable of emitting the most saturated colors without crosstalk but where crosstalk is present in other less saturated colors, the outer boundary of color space will be according to these most saturated colors which are unaffected. However, in those colors where crosstalk is present, the available color space (the inner region) will be smaller than one defined by the outer boundary. The inner region is bounded by an inner region boundary, which is determined by the actual color emission arising from crosstalk when a less saturated color emission is called for. Thus, in such displays, the color space has an outer boundary of the most saturated colors (where the emission is free from crosstalk) and an inner or interior region of less saturated colors (where the emission includes crosstalk) with an inner region boundary (where the emission is the maximum achievable saturation in view of the presence of crosstalk along a given hue axis). This situation results in a gap or discontinuity entirely contained between the outer boundary and the inner region of the color space. Such displays cannot inherently produce emission of colors within this gap or discontinuity.

Figure 5:
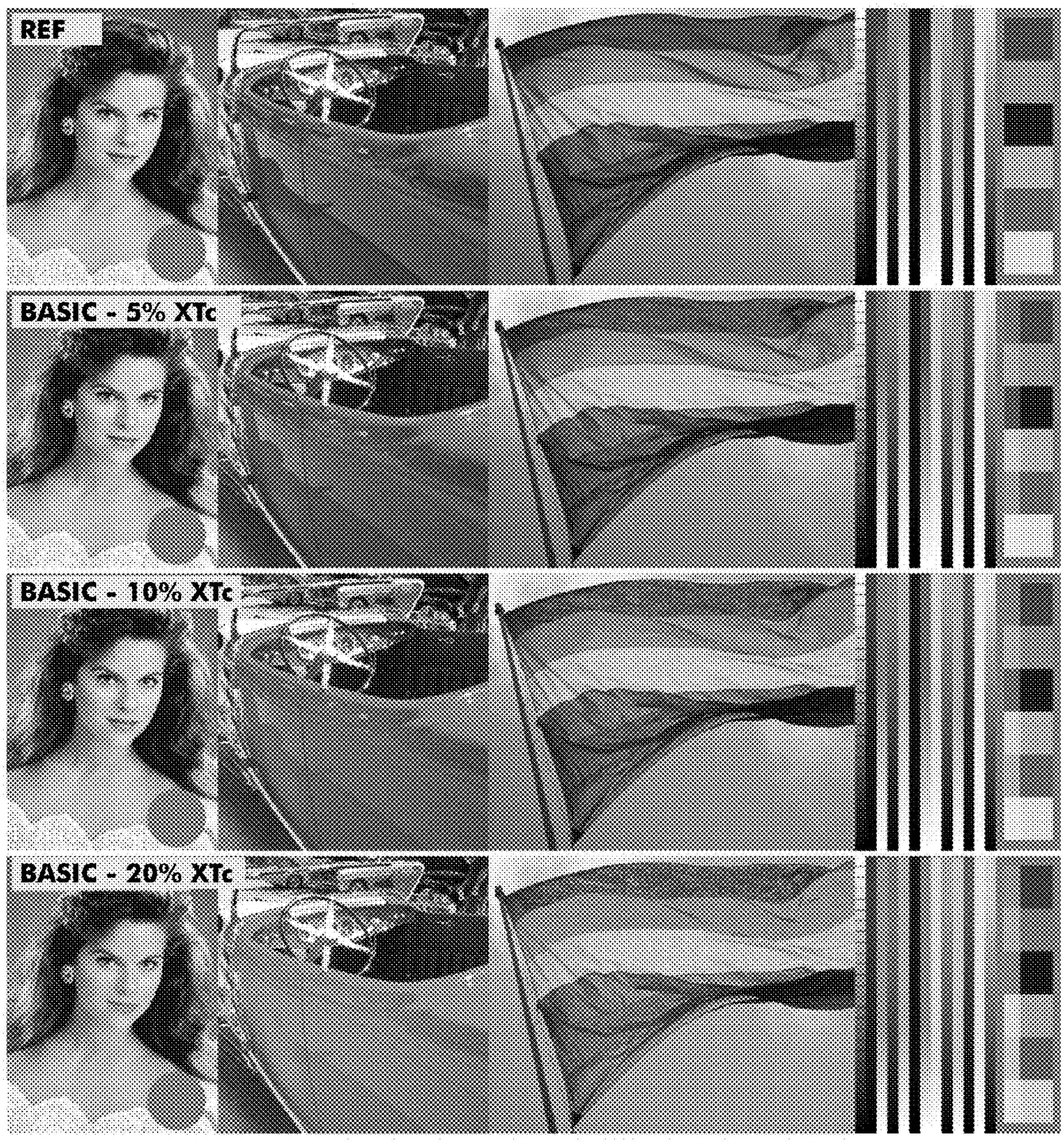
FIG. 5 illustrates the effect of varying levels of crosstalk on simulated images, where there is a gap in the color space caused by reducing or eliminating crosstalk effects only for the most saturated colors but not less saturated colors.

FIG. 5 illustrates the effect on modelled images due to having a gap in the color space in displays where crosstalk effects are reduced for only the most saturated colors but remain for less saturated colors. Colors in the gap effectively get clipped back to the inner region boundary due to the crosstalk. This results in severe image degradation and artifacts. As in FIG. 3, the top image is the reference, indicating a color-accurate image with zero crosstalk, along with three increasing levels of crosstalk (as labeled). The results show a discontinuity between the color-accurate in-gamut pixels (within the crosstalk desaturated gamut of the inner region) and the colors that remain at the "most saturated" outer boundary (where at least one subpixel has no emission). The colors in the gap between the inner region and the outer boundary are simply clipped to the inner region boundary (as in the difference in FIGS. 2A and 2B). The discontinuity is visible in some parts of the flag, as well as in the vertical color gradients (where there are distinct steps visible between the color patches, visible near the top). However, the most saturated colors are preserved and are not lost as in FIG. 3.

Since the presence of a gap or discontinuity in the color space provided by a display is undesirable, one solution would be to approximate at least one color within this space by a dithering process. Dithering is used in many imaging applications to create the illusion of color depth in images on systems (for example, printing systems and display systems) with a limited color space. In a dithered image, colors that are not available in the color space are approximated by selecting, mixing or diffusing together colors that are available only from within the available palette. The human eye would then perceive the generated mixture of the available colors as part of the overall color space. For displays with an internal gap in the available color space, dithering can be used to approximate the unavailable colors using colors that are available from the display. In particular, unavailable colors within the gap can be approximated through a dithering process either by selecting from among available colors or generated by mixing a most saturated available color and a less saturated available color. Desirably, both of the colors used in the dithering lie along the same hue axis, for example matching in hue while different in saturation. Desirably, the less saturated color used for the dithering would lie at the inner region boundary and the other would be the most saturated color which lies along the outer boundary.

Dithering can be spatial (either in the pixel layout or in color space), temporal, or a combination of spatial and temporal. Dithering can be used to approximate the missing colors within the gap that cannot be directly generated by the display.

One useful method for approximating colors with spatial dithering involves color mapping of the colors within the gap to either the outer boundary of most saturated colors or the boundary of the inner region along the same hue axis (color spatial dithering). The image controller uses a two-level mapping algorithm that first determines if the color called for by the image is within the intermediate gap region and then, maps the color to be the same as the nearest boundary, either the inner region boundary or the outer boundary. In this case, missing colors that are closer to the outer boundary get boosted to be the same as the most saturated color (the outer boundary) while missing colors that are closer to the inner region boundary get reduced back to be the same as the inner region boundary. While this method is simple and easy to apply, it can cause continuous color gradients to appear as discrete steps in some parts of the image. In addition, some hue errors can be introduced because the mapping is along an axis in the color space, which are not necessarily visually hue-uniform in practice.

Figure 6:
FIG. 6 illustrates the effect of varying levels of crosstalk on simulated images, where dithering has been used to map colors within the intermediate region to the inner region and outer boundaries.

The effect of this method of color spatial dithering in shown in FIG. 6. As in FIG. 3, the top image is the reference, indicating a color-accurate image with zero crosstalk, along with three increasing levels of crosstalk (as labeled) where a two-level mapping algorithm generates the colors within the gap between the boundary of the inner region and the outer boundary of the color space. The algorithm simply maps the missing color to the nearest boundary. The highly-saturated car gets boosted to the outer boundary. Parts of the blue sky are boosted to the outer boundary, while the lower saturation parts of the sky are reduced to the inner region boundary. Even though the car is not perfect visually, it is much improved over the image set of FIG. 5. The portrait fares well except in saturated shadows and lips. The color gradients show discrete steps or blocking where levels are mapped to inner or outer boundaries. Some hue errors are introduced (for example, in the gradients in the car door) because the mapping is along straight lines in u'v' chromaticity space, which are not necessarily visually hue-uniform.

Figure 7A:
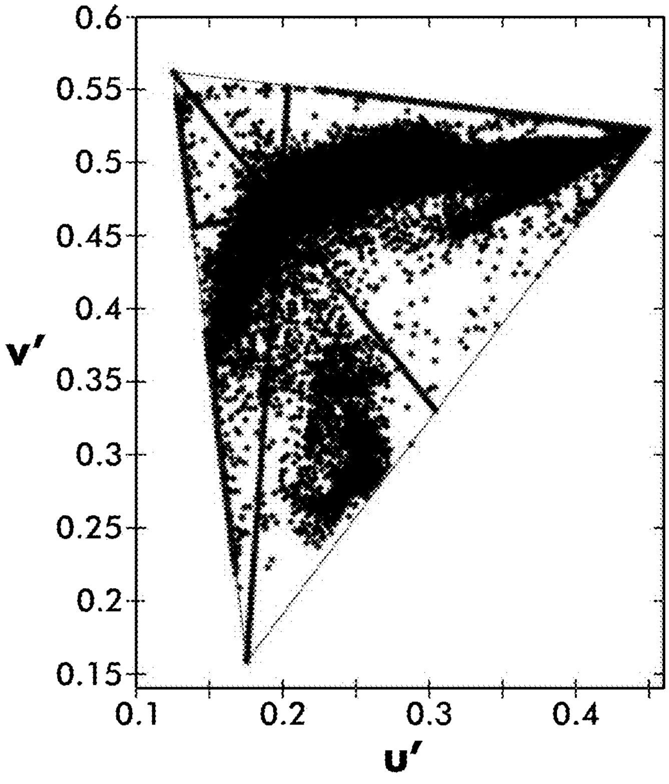
FIGS. 7A-7D shows the corresponding CIE 1976 u'v' chromaticity plots for the simulated images shown in FIG. 6.
Figure 7B:
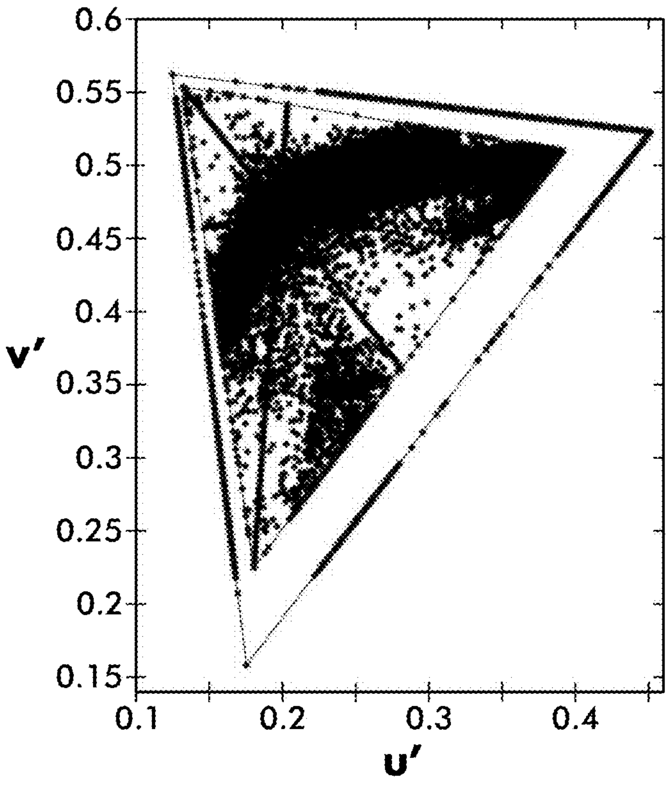
Figure 7C:
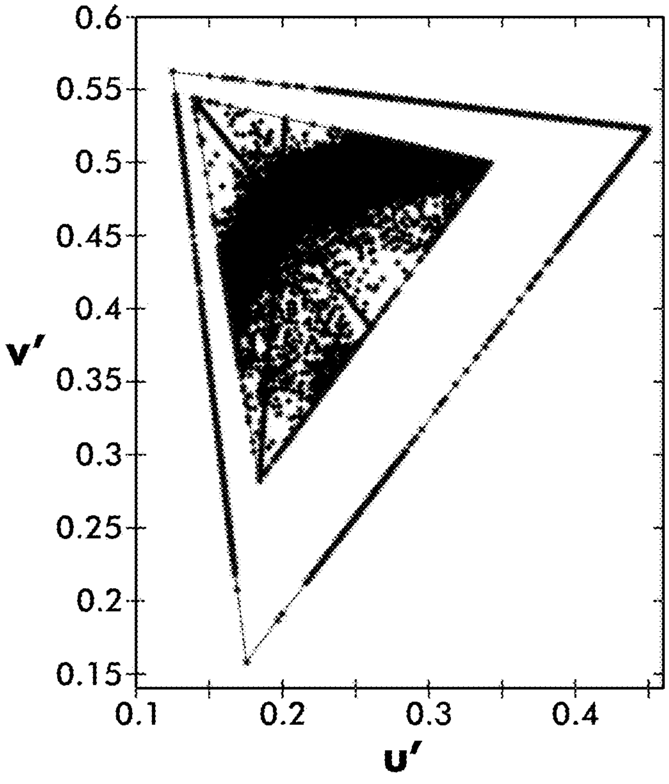
Figure 7D:
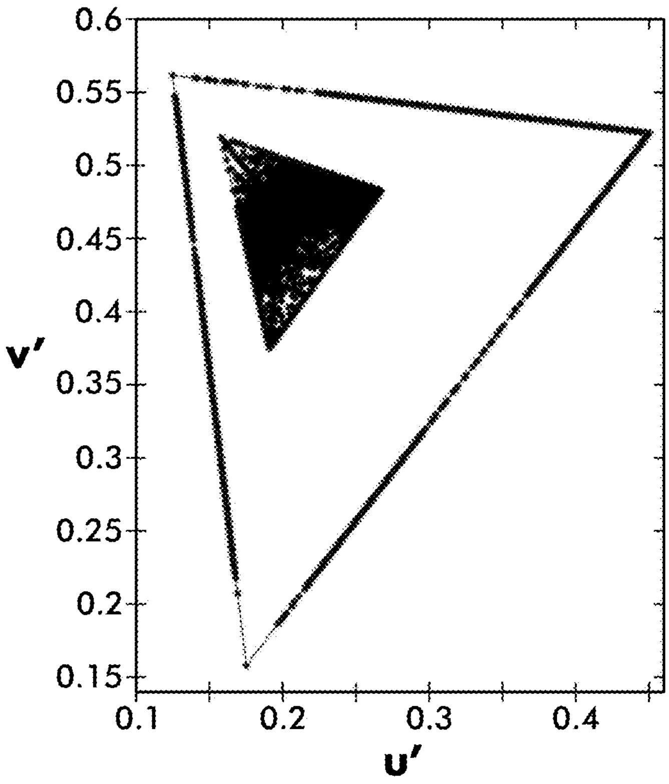

FIGS. 7A-7D shows the corresponding CIE 1976 u'v' chromaticity plots (similar to FIGS. 2A-2B) for the images shown in FIG. 6 using two-level mapping correction for image colors intended to be in the gap in the color space. FIG. 7A shows the accurate colorimetry of the pixels of the reference image. Three levels (FIGS. 7B-7D) of crosstalk as labeled demonstrate that the colors in the gap are pushed to the nearest (inner or outer) boundary.

The two-level mapping solution discussed above and illustrated in FIGS. 6 and 7A-7D can still lead to blocking artifacts in the image. Ideally, the colors within the gap in the color space should be able to be approximated at an arbitrary point along the same axis from the inner region boundary to the outer boundary in order to avoid such blocking artifacts.

One solution that enables the generation of additional intermediate colors within the gap is temporal dithering. In this case, in order to generate a color with the gap, the display would cause the emission from those pixels responsible for the missing color to rapidly alternate between emitting the most saturated color (the outer boundary) and emitting a less saturated color such as one within the inner region, particular the one that lies along the inner region boundary. Rapidly alternating between two colors can effectively generate any color (to the human eye) that falls between the two colors according to the relative time each is displayed. This method would allow for visually approximating any possible color that falls within the gap between the inner region and the outer boundary in a continuous manner.

Such temporal dithering could be accomplished in a number of ways; for example; within a single frame of the image or in alternating frames.

Temporal dithering within a single frame of the image can be accomplished to generate colors within a gap in color space by enabling crosstalk reduction over part of the frame time but not in another part of the frame time. When the crosstalk reduction is enabled for a most saturated color by an image signal, the most saturated color is emitted as intended by that pixel. However, if the crosstalk reduction is not enabled in that pixel, the crosstalk will degrade the most saturated color to a less saturated color (i.e., along the inner region boundary) even if the image signal (calling for the most saturated color) remains unchanged. Thus, for part of the frame time, the most saturated color (i.e., along the outer boundary) is emitted and for another part of the time, a less saturated color (i.e., along the inner region boundary) is emitted. By controlling the relative time of each emission within a single frame, any color that lies between the two boundaries can be visually approximated.

The control of the relative frame time that the crosstalk reduction is on and off may be according to the image signal. For example, for a subpixel in a most saturated color for which there should be no emission, the image signal to that subpixel should cause it to be "OFF" (i.e., CV=0). Such an image signal would then enable the crosstalk reduction function for the full frame. However, for colors within the gap which are still very saturated, some small amount of emission is necessary from all subpixels so that the image signal for those low emission subpixels will cause it to have corresponding low emission. In these cases, the relative time that the crosstalk reduction is enabled is dependent on the image signal.

For example, consider a display with crosstalk that would be equivalent to 4% (that is, with no adjustment for crosstalk, every subpixel has emission at least equivalent to 4% of its neighboring subpixel, even if the actual CV sent to that subpixel is 0). For a subpixel with an intended intensity of 1%, the relative time on/off could be 75:25, for an intended intensity of 2%, the time on/off could be 50:50, for an intended intensity of 3%, the time on/off could be 75:25, for an intended intensity of 4% and above, the crosstalk reduction would not be need to be enabled since such less saturated colors would be within the inner region and less affected by the presence of crosstalk.

Alternatively, the temporal dithering may occur by alternating whether the crosstalk reduction for the most saturated colors is on or off in different frames. For example, consider a standard display frame rate of 60 Hz. If the frame rate of the display was increased to 120 Hz, one frame could have the crosstalk reduction enabled for the entire frame but in the next frame, the crosstalk reduction is disabled for the entire frame. Since 2 frames at 120 Hz is equivalent to 1 frame at 60 Hz, this would result in approximating a color halfway between the two. Different ratios of colors could be achieved by enabling the crosstalk reduction more or less frequently over a number of consecutive frames. For example, enabling the crosstalk reduction in only 1 of every 4 frames would approximate a color ¼ of the difference between the two extremes. In this case, a faster frame rate (i.e., 240 Hz) would be desirable.

One variation of temporal dithering could be based on varying the frame rate where the crosstalk reduction is enabled for a fixed time for all frames. For example, for an intermediate color within the gap, the crosstalk reduction is enabled for a fixed time of 1/120 sec (50% of a 60 Hz frame rate). However, 1/120 sec is 75% of a 90 Hz frame or 33% of a 40 Hz frame rate, and so a different intermediate color within the gap would be generated.

It should be noted that although generally speaking that the rate of temporal dithering should be less than can be perceived by the human visual system, this may not be necessary in all cases. Flicker is when changes occur on a time scale that is sufficiently long to be noticed by a human eye (in spite of the persistence of vision) and is generally undesirable. However, flicker also depends on the magnitude and type of differences involved in the image changes; for example, luminance flicker (between lighter and darker) is much more visible than chromatic flicker (between colors at the same luminance). Desirably, the temporal dithering described herein involves alternation between pairs of colors differing largely in saturation rather than luminance, so the temporal dithering will be much less noticeable than in other systems that employ temporal dithering, such as pulse-width-modulated LED systems that alternate between high and low (essentially zero) luminance. Additionally, since the color and luminance of images are generally spatially correlated except at boundaries (that is, neighboring the pixels that make up a patch of color will all have similar colors and luminance except at a boundary), the overall perception of the small changes that might occur may not be objectionable. Moreover, since most pixels within an image are not highly saturated (i.e., within the inner region), they would not be affected. Only small portions of an image will be affected by this and again, small changes in small areas of the image may not be objectionable.

It would also be possible to mitigate any flicker problems in the above temporal dithering methods by additionally including some spatial blending between neighboring pixels. For example, because the emission of neighboring pixels is often highly correlated, pixels whose emission is falling within the gap are likely to have neighboring pixels who emission also falls within the gap. In such case, any of the above temporal dithering methods described above can be applied to two neighboring pixels, but out-of-phase with each other. This will lessen the appearance of any flicker.

Another type of suitable dithering methods can be based on spatial dithering based on the physical spatial relationships of the pixels. In a region of the displayed image, pixels whose intended emission falls in the gap may be selectively mapped to the inner region boundary and outer boundary (equivalently, to less-saturated and more-saturated colors) in a spatial pattern so that they appear to blend to an intermediate color when viewed from a normal viewing distance where the pixels are small, for example smaller than 25 pixels per degree of visual angle. Spatial patterns can be designed to have a spatial ratio of each type of pixel, for example alternating in a checkerboard. A randomized arrangement can be generated by accumulating a color error over neighboring pixels, as in error diffusion.

The selection of which colors are combined in a neighborhood of pixels can be determined by the image signal, desirably involving the spatial structure of that portion of the image.

The different methods of dithering may be combined. For example, the dithering based on two-level mapping as shown in FIGS. 6 and 7 offers improved results but is still prone to noticeable color artifacts. This problem can be further reduced by adding additional intermediate color points between the inner region and outer boundaries. These intermediate colors can be generated using, for example, any of the temporal dithering or physical spatial dithering methods as previously described.

For example, the dithering in FIGS. 6 and 7 for colors within the gap maps the intermediate color to either the inner region boundary or outer boundary on the same axis, whichever is closer (2 level mapping). However, it is possible to create a 3 (or more) level mapping where at least one intermediate color (generated by another dithering method) is available to the display. In general, more intermediate levels are preferable, resulting in more complete correction for crosstalk. In this case, any color within the gap is then mapped on the same hue axis to the inner region boundary, an intermediate color, or the outer boundary, which is closest. This mapping could also be done in a uniform color space such as CIELAB or a hue-linear color space such as IPT.

Figure 8:

An example of this kind of combined method is shown in FIG. 8. As in FIG. 3, the top image is the reference, indicating a color-accurate image with zero crosstalk, along with three increasing levels of crosstalk (as labeled) where a three-level mapping algorithm generates the colors within the gap between the boundary of the inner region and the outer boundary of the color space. The colors within the gap are mapped to the inner region boundary, the outer boundary or an intermediate level between the two. The intermediate level would be made possible by the various methods for spatial and/or temporal dithering; however, in this Figure, it is simulated to represent the visual result. As compared to the images of FIG. 6, the addition of a three level mapping results in much less overall distortion in all elements of the composite image. Some hue errors are introduced (as in the previous method) but they are less apparent. More intermediate levels would further reduce any distortions or artifacts in the image.

Figure 9A:
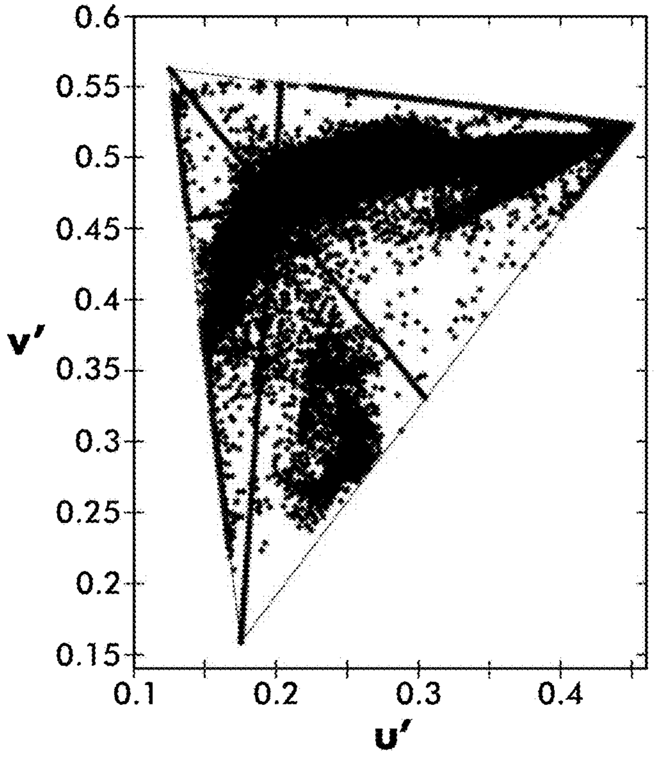
FIGS. 9A-9D shows the corresponding CIE 1976 u'v' chromaticity plots for the simulated images shown in FIG. 8.
Figure 9B:
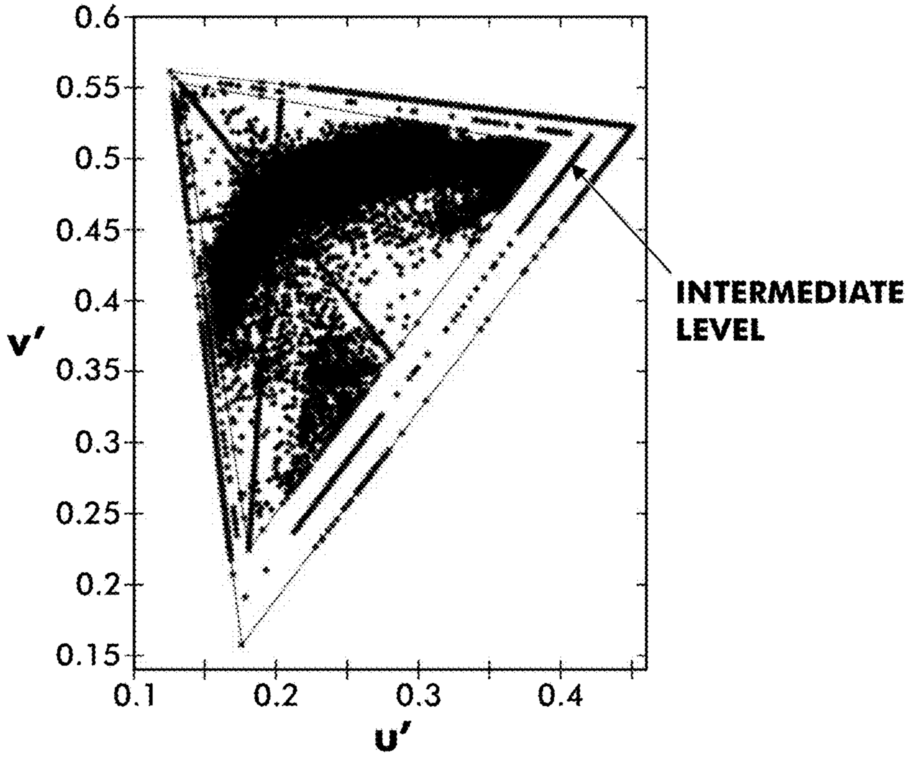
Figure 9C:
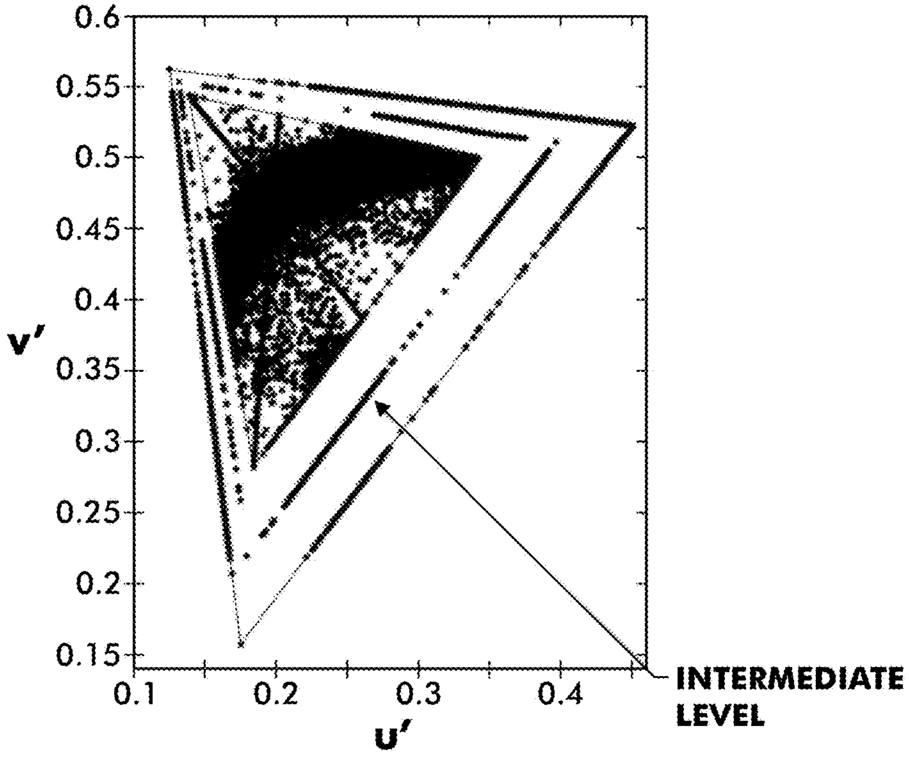
Figure 9D:
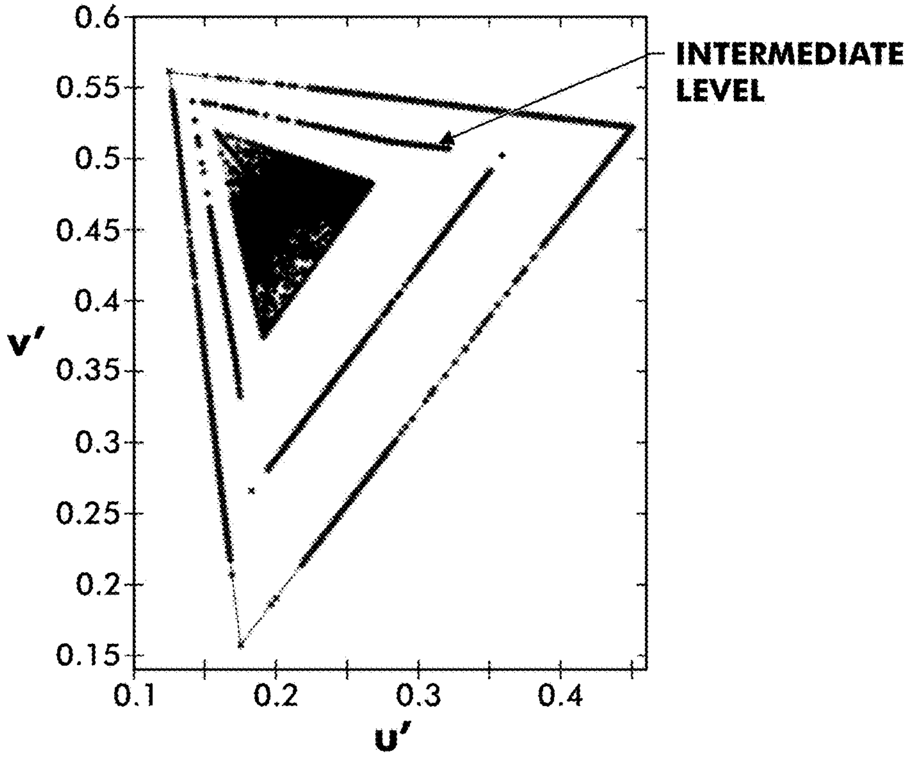

FIG. 9A-9D shows the corresponding CIE 1976 u'v' chromaticity plots (similar to FIG. 4) for the images shown in FIG. 8 using three-level mapping correction for the gap in the color space. FIG. 9A shows the accurate colorimetry of the pixels of the reference image. Three levels (FIGS. 9B-9D) of crosstalk as labeled demonstrate that the colors in the gap are mapped to one along inner region boundary, an intermediate color point or an outer boundary.

Thus, in a display with a gap in color space where some colors cannot be generated directly by the display, the outer boundary is formed from the emitted most saturated colors, the inner region and inner region boundary is formed from emitted less saturated colors and in the intermediate (gap) region between the inner region and outer boundaries, the colors are approximated by dithering between two colors (i.e., a more saturated color and a less saturated color), both of which the display is capable of emitting directly. Desirably, at least one color within the gap is generated by dithering; more desirably, two or more colors are generated by dithering; and most desirably, a continuous range of colors within the gap are generated by dithering. This allows the display to maximize the color space in an image while reducing undesirable artifacts.

FIG. 10 provides an illustration of some of the dithering methods described. FIG. 10A shows a reference plot of saturation versus spatial position for a 1-dimensional line of pixels. The appearance of this would be a smooth spatial gradient increasing in saturation, for example a smooth gradient from gray to red. FIG. 10B shows the result of crosstalk limiting the saturation range; saturation values are the same as in FIG. 10A for pixels 0-40, then further pixels are clipped at saturation 75 (units are arbitrary (a.u.), for illustration), which in this example serves as the inner region boundary. FIG. 10C shows the result of two-level mapping, in which pixels of intended saturation (as in reference, FIG. 10A) that are beyond the inner region boundary (saturation 75) are mapped to two levels: either the inner region boundary (75) or the outer boundary (100), whichever is closer for each individual pixel. This results in a discrete step at pixel 60. However, as the spatial extent of pixels is generally small relative to the resolution of the human eye, the visual result of localized spatial integration is expected to be a smoothed step, as shown by the dashed line. FIG. 10D shows a preferred mapping solution that incorporates spatial dithering. Pixels in the gap are mapped to either the inner region boundary (75) or the outer boundary (100) considering their neighbors, to minimize the accumulated error between the mapped pixels and the intended reference saturation. This results in stepping back-and-forth between the inner region and outer boundaries, with more pixels at the inner region boundary at relatively lower intended saturation (for example, pixels 40-50) and more pixels at the outer boundary at relatively higher intended saturation (for example, pixels 70-80). Again, a dashed line shows the expected visual result of localized spatial integration, which is somewhat bumpy but similar in overall slope to the reference shown in FIG. 10A.

Figure 10A:
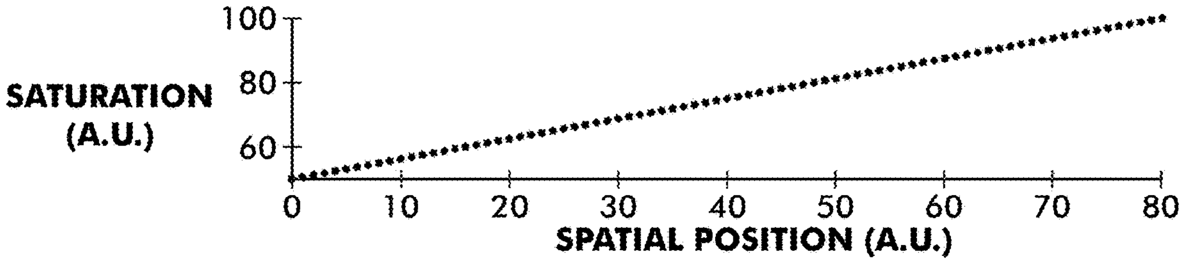
FIG. 10A-10D illustrates spatial dithering that can be used to compensate for color defects caused by crosstalk in a display.
Figure 10B:
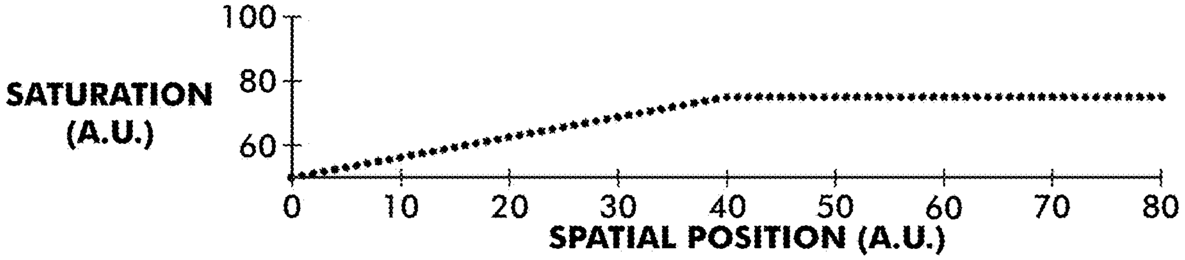
Figure 10C:
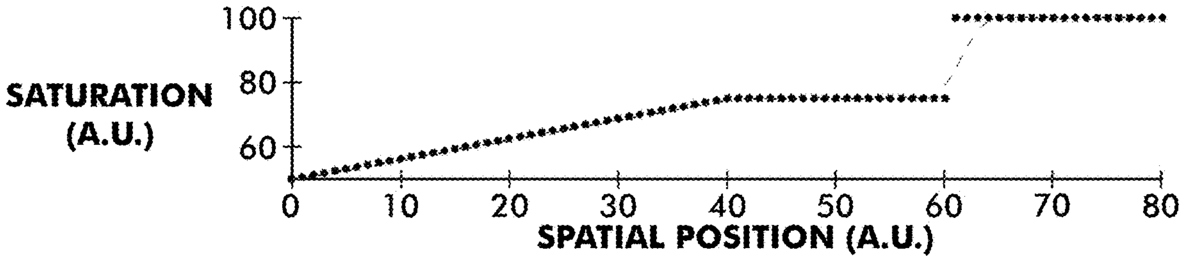
Figure 10D:
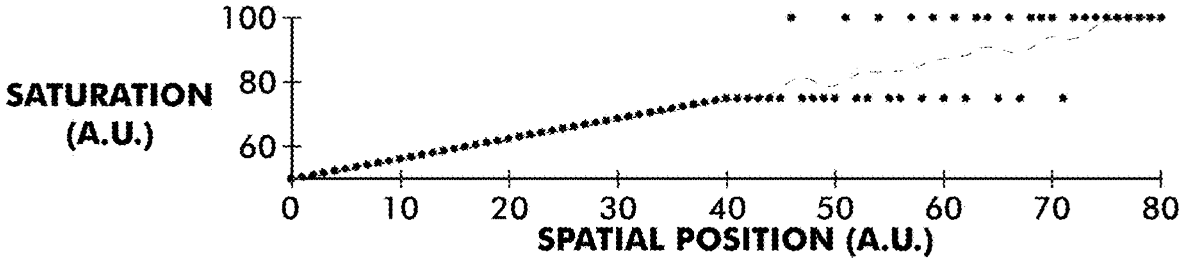
Figure 11A:
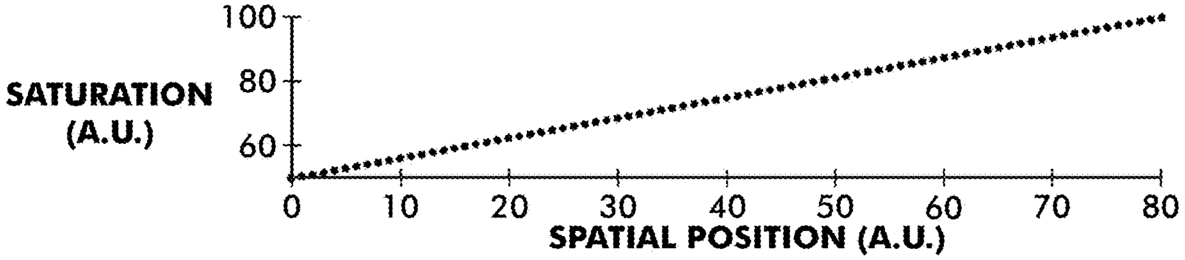
FIG. 11A-11D illustrates spatial and temporal dithering that can be used to compensate for color defects caused by crosstalk in a display.
Figure 11B:
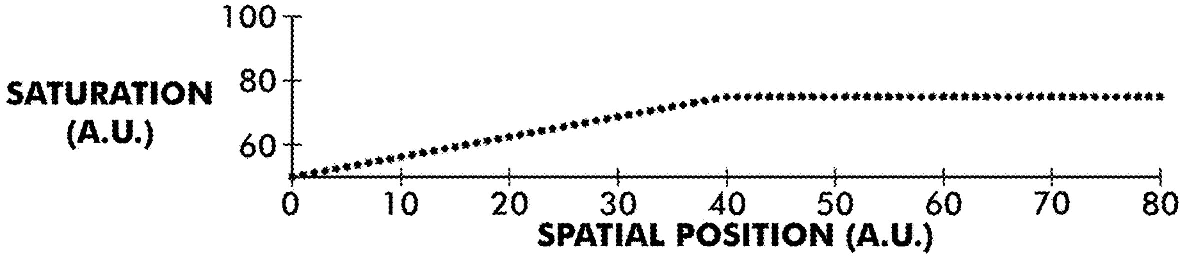
Figure 11C:
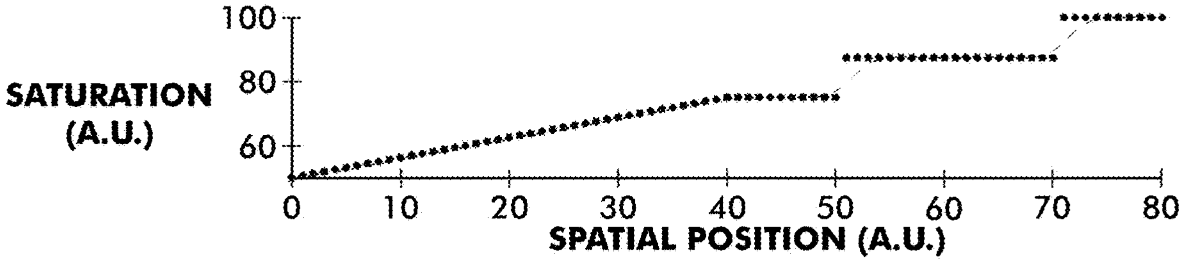
Figure 11D:
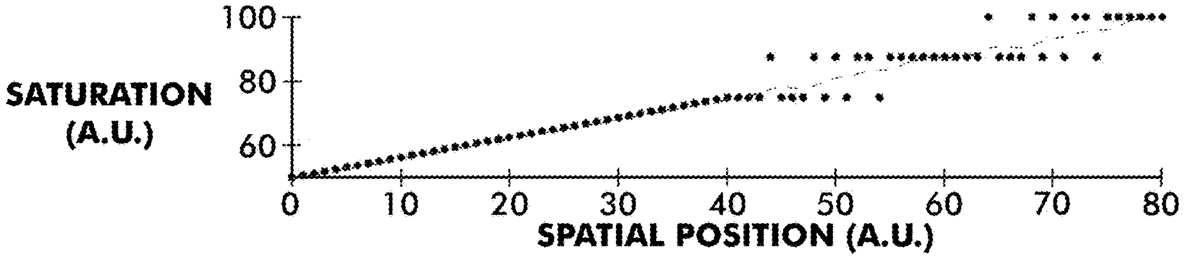
Figure 12A:
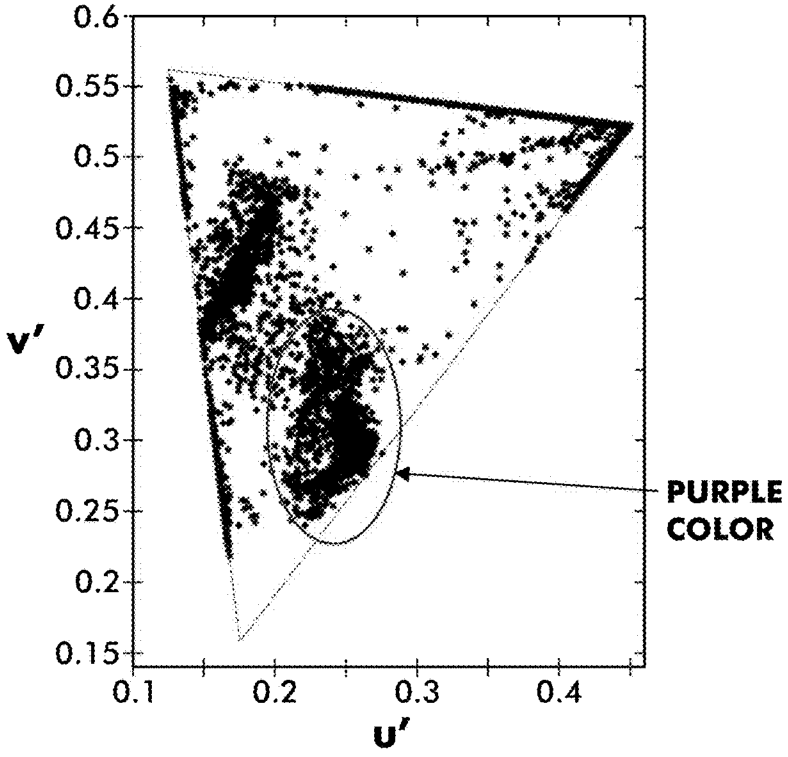
FIG. 12A-12D shows colorimetric results for of some of the different dithering methods described.
Figure 12B:
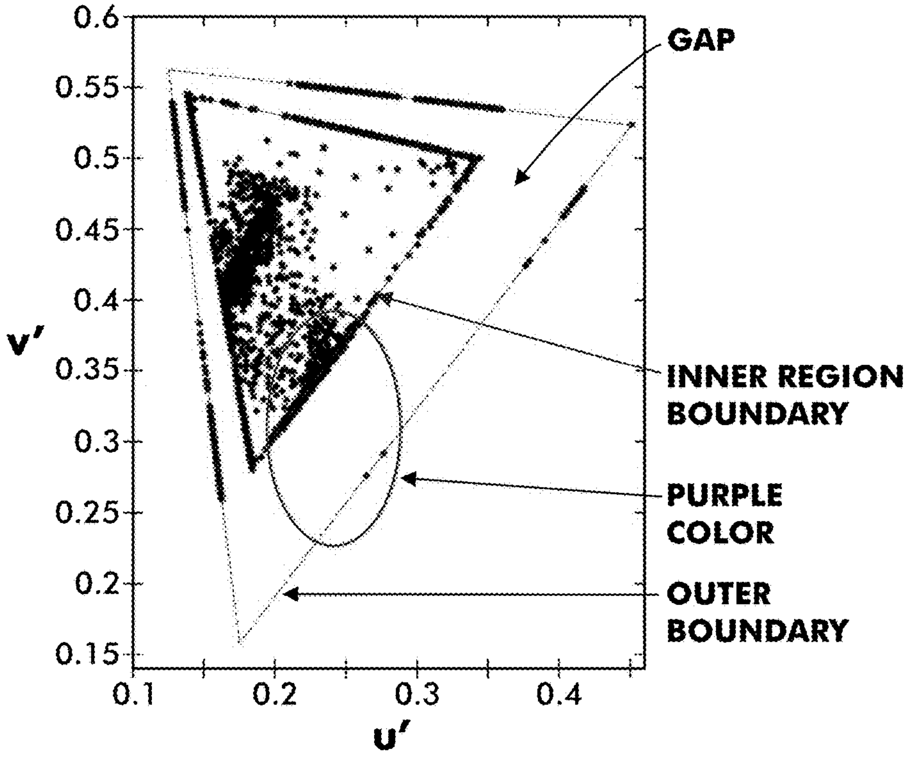
Figure 12C:
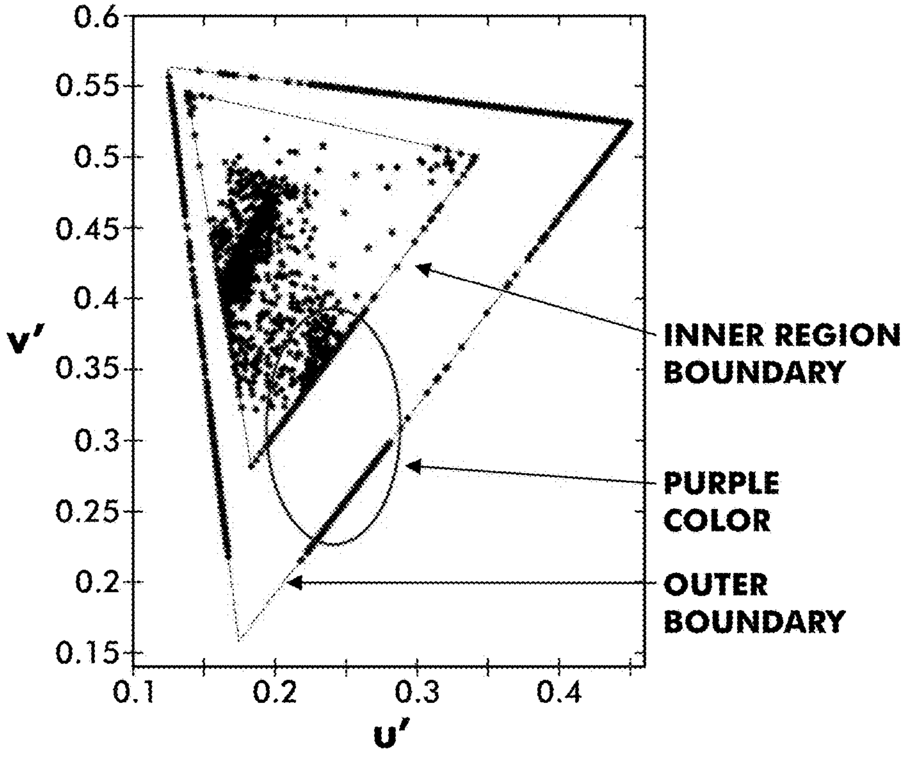
Figure 12D:
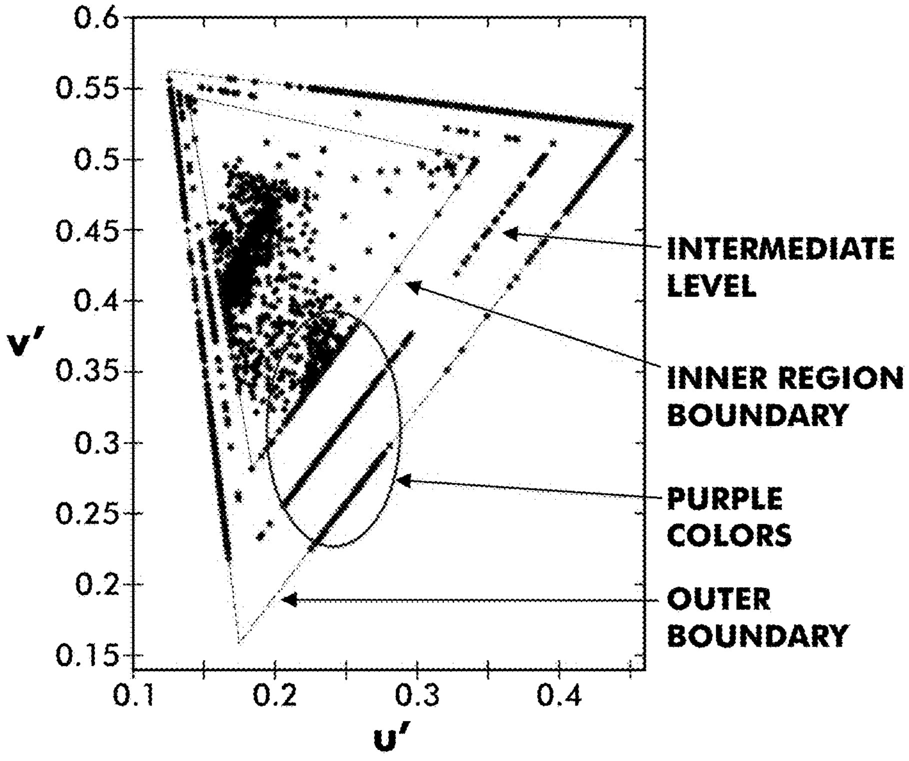

FIG. 11 shows a similar illustration to that in FIG. 10; in fact, FIG. 11A is the same reference as FIG. 10A, and FIG. 11B shows the same clipping resulting from crosstalk as shown in FIG. 10B. FIG. 11C shows the result of three-level mapping, in which pixels whose reference intended saturation is in the gap (between 75 and 100) are mapped to the nearest of: the inner region boundary (75), an intermediate level (87.5), or the outer boundary (100). This results in two discrete steps, which are expected to visually produce two smoothed steps as shown by the dashed line—visually smoother than the single step from FIG. 10C. FIG. 11D shows the result of spatial dithering in combination with three-level mapping, in which pixels whose reference intended saturation is in the gap (between 75 and 100) are mapped to either the inner region boundary (75), an intermediate level (87.5), or the outer boundary (100), considering their neighbors. Pixel saturation levels step between these three levels in accordance to the intended saturation, and the expected visual result is the smoother gradient shown as a dashed line.

FIG. 12 shows the colorimetric result of some of the different dithering methods described. FIG. 12A shows the color-accurate reference chromaticities of a selection of the pixels in the flag image used in FIG. 3. The labeled ellipse shows a cloud of points corresponding to the purple pixels in the flag image, which are distributed in chromaticity space widely in saturation (roughly, up-down in the diagram) and more narrowly in hue (roughly, left-right within the ellipse). They also vary in luminance, but that dimension is not shown in a chromaticity diagram. FIG. 12 B shows the result of basic crosstalk reduction, in which the few points at the outer boundary are preserved, but most of the pixels whose intended colors fall in the gap are mapped to the inner region boundary. The image corresponding to this plot is in the third row of FIG. 5, showing drastic degradation by the consistent loss in saturation. FIG. 12C shows the result of a two-level mapping, in which the pixels whose intended colors fall in the gap are mapped to the nearer of the inner region boundary or the outer boundary. The image corresponding to this plot is in the third row of FIG. 6, showing that the saturation of purple portion of the flag is preserved, compared to FIG. 5; in fact, because some of the pixels are mapped to the outer boundary, the purple appears slightly more saturated and slightly different in hue than the reference image in the top row of FIG. 6. FIG. 12D shows the result of a three-level mapping, in which the pixels whose intended colors fall in the gap are mapped to the nearest of the inner region boundary, the outer boundary, or an intermediate level between. The image corresponding to this plot is in the third row of FIG. 8, showing that the saturation and hue of purple portion of the flag are preserved, compared to FIG. 5 and FIG. 6. Note that the use of an intermediate level greatly improves the color reproduction accuracy by making intermediate colors available and thereby avoiding over- and under-saturating the image pixels.

The amount of crosstalk present in any subpixel is increased as the difference in emission levels between neighboring pixels is greater and often decreases as the distance between the pixels is increased. For a most saturated color, at least one subpixel should have no emission and so, crosstalk reduction is enabled by the image controller to ensure there is no emission from crosstalk in that subpixel. The image controller could also determine the relative image signal for neighboring or surrounding pixels at the same time and determine if the emission is in a range that will be affected by crosstalk.

For example, the image controller determines that a particular subpixel should have no emission (in a pixel with a most saturated color) and so, the image signal for at least one subpixel is for no emission (i.e., CV=0) and enables the crosstalk reduction for that subpixel. For pixels emitting less saturated colors, the image controller samples the image signals for the neighboring subpixels. If the image signal for a subpixel is greater than or equal to a neighboring subpixel (for example, for colors of the inner region), any crosstalk will be minimal and so, the crosstalk reduction is not enabled for that subpixel. However, if the difference in image signal is such that the emitted color will fall within the gap, then the relative difference will enable the appropriate level of dithering.

For primary colors, R indicates red light (>600 nm, desirably in the range of 620-660 nm), G indicates green light (500-600 nm, desirably in the range of 540-565 nm) and B blue light (<500 nm, desirably in the range of 440-485 nm). For secondary colors, Y (yellow) indicates both R and G light and no B light; C (cyan) indicates both B and G light with no R light, and M (magenta) indicates both B and R light with no G light. In theory, the most saturated colors in a RGB system will be those colors where at least one of R, G or B is not present and the corresponding subpixel has no emission. For example, the most saturated colors can be: R (where no G or B is present), G (where no B or R is present), B (where no G or R is present), Y (where no B is present), C (where no R is present) and M (where no G is present). Note that a most-saturated color does not have to be high in luminance. For example, an RGB intensity combination of (100%, 0%, 0%) is the highest luminance, highest-saturation red available; an RGB intensity combination of (20%, 0%, 0%) a highest-saturation red of a different (lower) luminance. Whenever at least some amount of the missing color(s) is present, the color will appear less saturated. Unless otherwise noted, wavelengths are expressed in vacuum values and not in-situ values.

Active-matrix displays are generally understood to have an array of individual controlled subpixels arranged in a two-dimensional array of orthogonal columns and rows. However, it is also understood that "columns" and "rows" are subjective terms and do not imply any particular orientation but rather two groupings of individual subpixels which only overlap at a single point. It is conventional in the active-matrix art that "columns" are generally portrayed as being aligned in a vertical direction in the array and "rows" are generally are generally portrayed as being aligned in a horizontal direction in the array. Likewise, there are common electrical connections for all subpixels along a "column" which are conventionally referred to as "data lines" and which are portrayed as being in a vertical direction as well common electrical connections for all subpixels along a "row" which are conventionally referred to "scan" or "select" lines and which are portrayed as being in a horizontal direction. However, these conventional terms may or may not reflect the actual physical locations of the subpixels. It is generally understood that "data signals" or "image signals" sent to a pixel control the amount of luminance required by that pixel, while "scan or select signals" control the timing of when the "data signal" is sent and received by the pixel.

The image controller typically causes the display to emit over a short period of time ("frame") for one image signal and then, subsequently refreshes the display according to a new image signal. Thus. moving images can be displayed by a series of frames over time. Typically, the frame time is chosen to be below the detection limit of the human visual system in order to avoid noticeable flicker and that any changes in the image displays are smooth and seamless.

The data or image signal in displays is sent by the control circuitry to each subpixel to control the level of its emission. It is common that these image signals are not continuous but quantized into some number of levels between the signal that generates the upper or maximum level of emission and the signal that generates no or the least amount of emission. These levels are called Code Values or CV (among other designations). A common system used in displays is where a CV=0 indicates no emission and a CV=255 indicates maximum emission so that there are 254 discrete intermediate levels between the two extremes.

While the subpixels in active-matrix displays are typically laid out in rows or columns, spatially correlated subpixels, each emitting a different color, are combined as a group to form an individual pixel. Their combined emission forms the emission from the pixel. The subpixels in a pixel can be laid out in any pattern. For example, one column may be composed of alternating G and R subpixels while an adjacent column is composed only B subpixels. Alternatively, the pattern may be of alternating R, G, and B columns. In some cases, the crosstalk reduction/dithering methods of the invention may be applied to only subsets of the columns or rows and not all subpixels. For example, it could be applied only to a R column and not the G and B columns. Crosstalk reduction can also be described in terms of neighboring pixels, where a neighboring pixel includes those immediately adjacent in horizontal, vertical, or diagonal directions, as well as nearby in any direction, for example at a physical distance up to 20 times the pixel pitch, or as viewed by a user, up to 0.5 degrees of visual angle. Crosstalk reduction may be applied differently to the different R, G, and B color channels, either according to the magnitude of crosstalk present, the visibility of crosstalk in certain colors, or a combination.

In active-matrix displays, each subpixel must have at least one individually controlled electrode that is separate and distinct from the individually controlled electrodes of other subpixels in order to operate. In other words, the individually controlled electrode portion of each subpixel is 'segmented' or divided up into individually controlled portions as compared to being common or continuous across all subpixels. Typically, electrical connection of the subpixel circuit to the light-emitting element is made through the segmented electrode. Note that in the context of this description, a "subpixel" acts as a single, uniform and minimum unit and is not further subdivided. For a subpixel, "OFF" means that the image signal is set so that there is no light being intentionally emitted from the pixel and "ON" means at least some light above a minimum level is intended to be emitted. A pixel that is "OFF" should have no more than 1% of the maximum emission that can be produced, and more preferably 0.01%. Ideally, an "OFF" pixel should have no emission at all. An "OFF" pixel can also be called a "dark" or "black" pixel, which are equivalent terms.

Elimination of crosstalk by any method in one subset of pixels but not in all pixels will lead to a gap in color space. Desirably, any crosstalk reduction method should be applied only to pixels emitting the most saturated colors at the outer boundary because these will show the greatest impact due to the crosstalk. However, in some cases, it may be useful to also apply crosstalk reduction to colors that are close in saturation to the most saturated colors as well, particularly if the crosstalk reduction method does not prevent all emission of the pixel and only reduces the amount of unwanted emission. However, for those crosstalk reduction methods that prevent any emission and so cannot distinguish between crosstalk and low levels of emission due to the image signal, this will cause those less saturated colors to collapse back to the most saturated colors. Depending on the display, this can still result in acceptable results.

Thus, any display that 1) includes control circuitry that determines if a pixel has at least 1 subpixel that has an image signal for no emission, 2) then reduces or prevents emission from that subpixel, can benefit from reducing the resulting gap in color space by dithering available colors to fill in, at least in part, the gap. In particular, an example of one such mechanism of reduction or prevention of emission can involve controlling the potential at the bottom electrode of the OLED electrode. In some embodiments, the application of any crosstalk reduction technique for a particular subpixel may be dependent on the image signal and in particular, whether that subpixel is supposed to be "OFF". For example, the crosstalk reduction can be applied to a fully saturated color where the image signal of at least one subpixel corresponds to no emission or below a luminance threshold chosen between 1% and 0.01% of the maximum luminance for that chromaticity. For example, in an 8-bit, sRGB-like color encoding, 1% intensity corresponds to about CV 26, while 0.01% corresponds to less than one CV. Using more than 8 bits or using a different nonlinear encoding would mean 1% or 0.01% would correspond to different CVs, so the threshold for crosstalk reduction can be specified in luminance, percent luminance, or CV. However, the application of any crosstalk reduction technique may be determined by a process without regard to and independent from the image signal.

While the cause of the gap in color space has been discussed in terms of the effects on color saturation caused by crosstalk, this is not the only mechanism which cause a display to have a gap in its color space. Other causes that result in a gap in color space could include large quantization steps, low bit-depth, two or more "modes" of operation with different luminance or intensity ranges. Any such display with a gap in the color space, without regard to the mechanism that causes a gap, can benefit from reducing the gap in color space by dithering available colors to fill in, at least in part, the gap. Some display systems use discrete color steps; that is, the colors that lie along the same hue axis are not continuous, but divided into small steps (quantization). Often the differences in the steps are small and so, not obvious to the eye. This kind of "gap" is inherent to the display and is different from a gap in color space where it is necessary to generate intermediate colors caused by partial crosstalk correction.

The technique of dithering available color to fill in a gap in color space can be used in any display that has a non-continuous color space for any reason. It is not necessarily limited to displays that include a correction for crosstalk reduction that causes a non-continuous color space. It also can apply to any device, including printers and other non-display devices that can produce an image based on digital data, with a non-continuous color space without regard to the mechanism which causes a non-continuous color space. It is not limited to RGB or RGBW devices but can also be used in other kinds of color spaces including B+Y, B+Orange, CMY, CMYK and others. It can be applied to monochrome devices, particularly green monochrome displays.

Applications can include:

A method of generating an improved color space in a display comprising an outer boundary of the entire color space according to the most saturated colors and an inner region formed by less saturated colors which has an inner region boundary; wherein:

- at least some colors in an intermediate region between the inner region and outer boundaries are approximated by dithering between a more- or most-saturated color and a less saturated color.

The above method can be applied to any display where there is gap or discontinuity in the color space. The gap can be caused by the display not being capable of emitting colors between a most saturated color and a less saturated color.

A method of generating an improved color space in a display comprising the steps of:

- determining an outer boundary of the entire color space according to the most saturated colors based on an image to be displayed;
- determining an inner region formed by less saturated colors that has an inner region boundary based on an image to be displayed;
- determining if there is a gap between the inner region and other boundaries of the color space where the display cannot inherently emit the colors within the gap;
- if the gap in color space between the inner region and outer boundaries exists, then forming at least one color within the gap by dithering between the most saturated color of the outer boundary and a less saturated color to form colors of an intermediate region.

The above method where the dithering can be spatial in terms of points within a color space (color spatial dithering), temporal, or spatial in terms of relative pixel location (physical spatial dithering), or combinations thereof. The less saturated color can be along the inner region boundary along the same hue axis. The step of determining the outer boundary of the color space can include determining if the image signal of at least one subpixel of a pixel corresponds to no emission or below a luminance threshold, for example 1% of the maximum luminance at that chromaticity, or CV=0 or CV<26. The above method can include an additional step of applying a crosstalk reduction method to any subpixel with an image signal corresponding to no emission or below a threshold of 1% of maximum luminance. Thus, in cases where the luminance threshold is applied, the resulting highly saturated emission is considered to be included as a "most saturated color".

The above methods where the display is an OLED which is a multimodal (white light-emitting) microcavity with a color filter array, can have 3 or more stacks of light-emitting units, and can have a threshold voltage $V_{th}$ of 5V or greater. The crosstalk reduction method can involve reduction or prevention of emission by controlling the potential at the bottom electrode of the OLED subpixel electrode based on whether its image signal corresponds to no emission or is below a threshold.

Figure 1B:
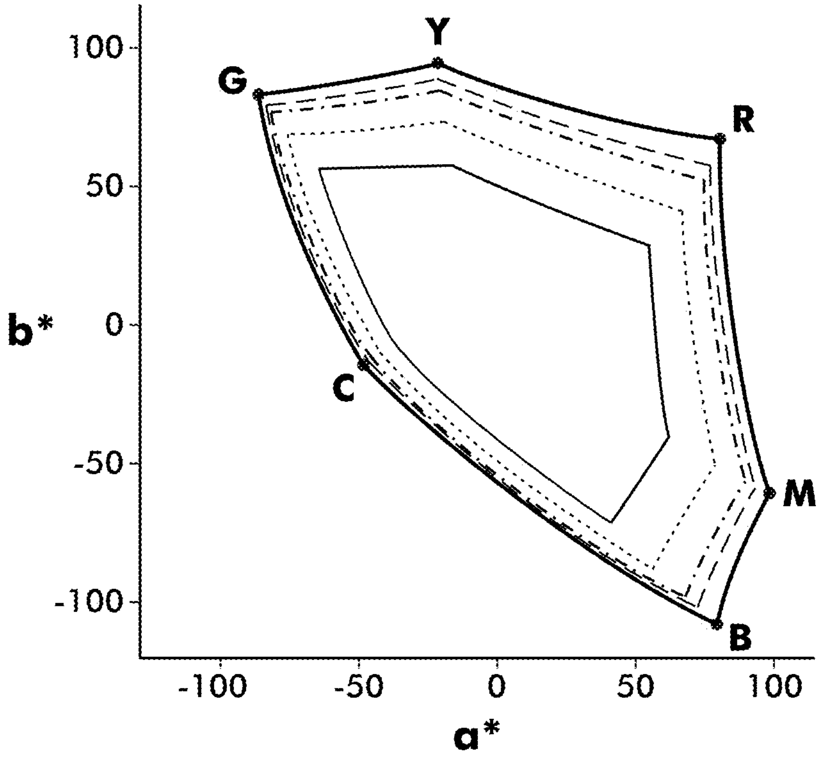

Crosstalk can create an "intermediate region" or "gap" in color space of colors that cannot be generated by the display. The size of the gap, meaning the difference in color between the inner region and outer boundaries, will typically be larger in the primary color directions, and is also affected by luminance. Because the color gamut volume (the range of colors made possible by a display) is generally a 3D polyhedron-like solid, the gap is actually the space between two 3D polyhedron-like solids, making it difficult to illustrate in 2D. The 2D projection in a chromaticity diagram (as shown in FIG. 1A) or in the a*b* plane of CIELAB (as shown in FIG. 1B) show the concept of the gap, but do not fully show the shape or extent of the gap.

Figure 13:
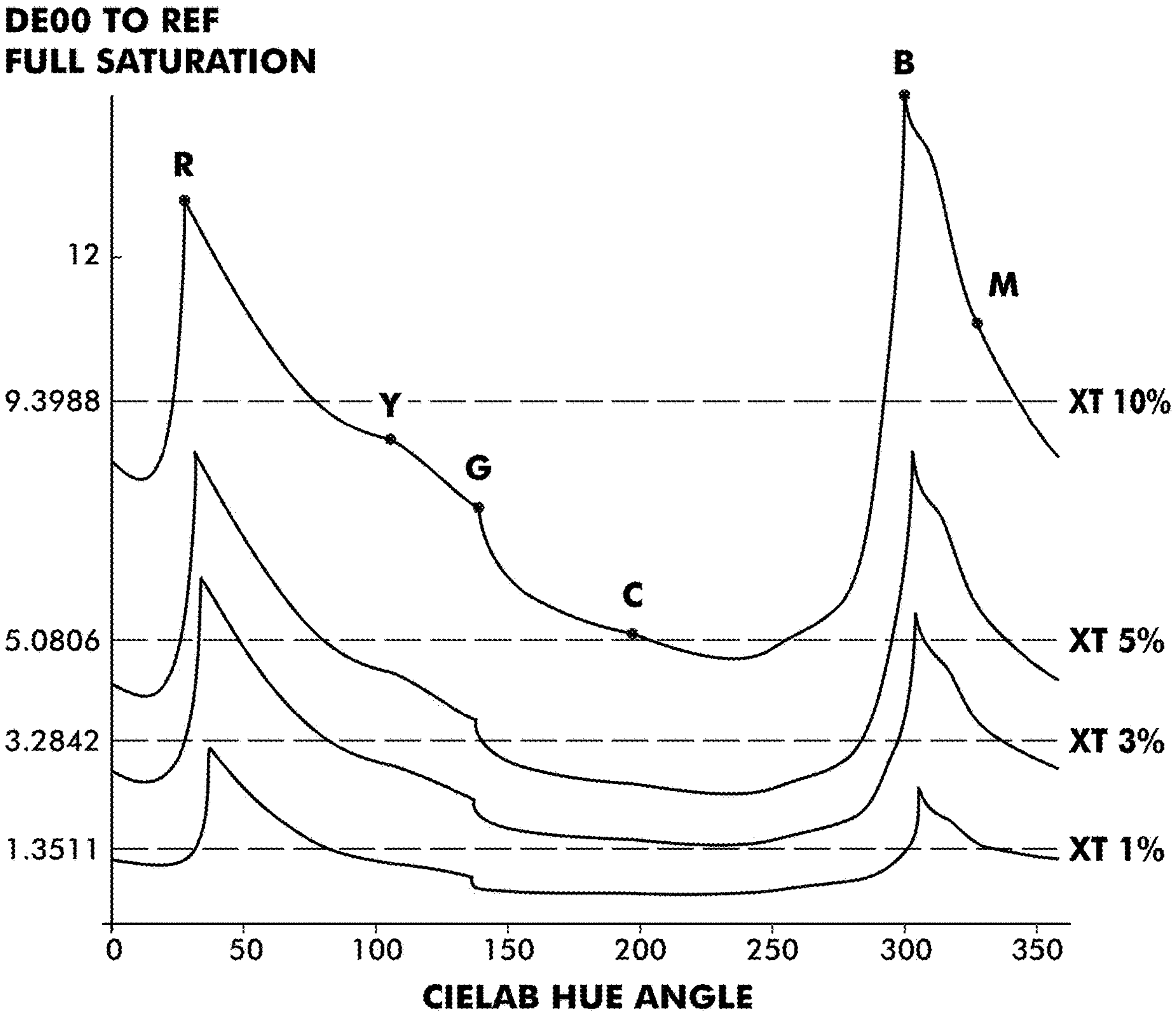
FIG. 13 shows a plot of DE00 against hue angle.

While crosstalk and other effects can cause a gap in color space in displays where some pixels are affected and others are not, the size of the gap is not necessarily constant for all colors. Depending on the characteristics of the display, some colors can be more impacted than others and so, can introduce color errors in the display's output. For a desired highly-saturated color, the difference between the resulting color with crosstalk and the resulting color with crosstalk reduction can be measured in terms of color difference, such as DE00. This is illustrated in FIG. 13, which plots DE00 vs CIELAB hue angle for a set of maximum-saturation colors in an sRGB-like display system (essentially, the locus of colors connecting the primary and secondary colors, a ring in 3D color space from Red to Yellow to Green to Cyan to Blue to Magenta, and back to Red) with various levels of crosstalk. The plotted DE00 values are essentially the color differences between the triangles shown in FIG. 1A, accounting for luminance as well as chromaticity differences. The height of each solid line in DE00 describes the size of the gap, which is different for different hue angles; dashed lines show the average DE00 over all hue angles, labeled with the corresponding level of crosstalk (XT). For all levels of crosstalk, DE00, which corresponds with the size of the gap, is much larger for red (hue angle ~28), blue (hue angle ~300) and magenta (hue angle ~327) colors and smaller for green (hue angle ~139), cyan (hue angle ~197)

and yellow (hue angle ~105) colors. Because the gap size is different for different hues, the need for, and application of, crosstalk reduction can be different for different hues. In such situations, the use of dithering to generate colors within the intermediate region (the gap) may only be applied to only some selected colors of the image and not all colors in the image.

In OLED displays with common layers, crosstalk can be caused by lateral charge carrier migration through the common layers from one subpixel to neighboring subpixels. Crosstalk can also be a significant problem in microdisplays where the subpixels are small and very densely packed in order to achieve high resolution. OLED microdisplays with common layers are particularly prone to unacceptable levels of crosstalk. Desirably, the OLED is a multimodal (white light-emitting) microcavity with a color filter array and can have 3 or more stacks of light-emitting units. Such OLED formulations can achieve high levels of luminance while maintaining ease of manufacturability.

Figure 14:
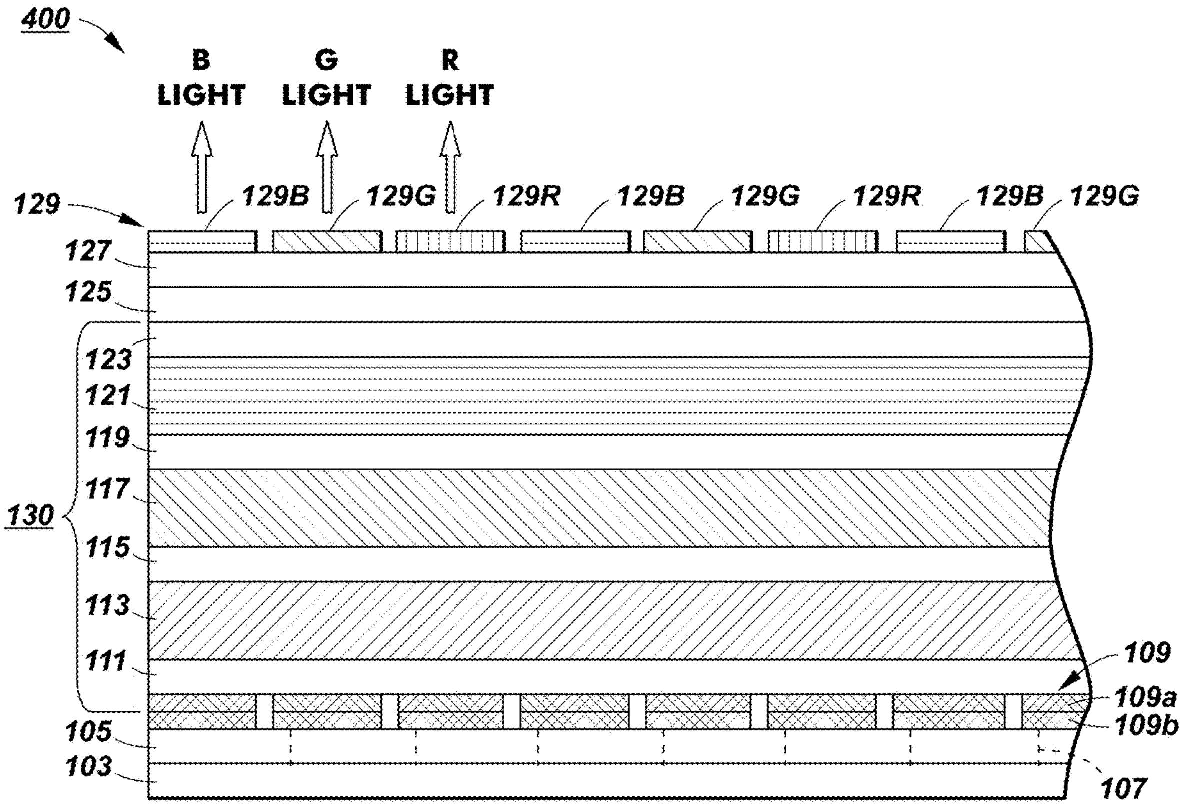
FIG. 14 shows the cross-section of an OLED display 400 where the OLED is a multimodal microcavity.

A suitable multimodal microcavity OLED is illustrated in FIG. 14.

FIG. 14 illustrates a display 400 that uses a multimodal (white) OLED microcavity that is common across all pixels together with a color filter array (CFA) to create R, G, and B pixels. A multimodal OLED produces more than one color of light. Ideally, a multimodal OLED produces a white light with roughly equal amounts of R, G and B light. Typically, this would correspond to $CIE_x$, $CIE_y$ values of approximately 0.33, 0.33. However, some variation from these values is still acceptable or even desirable depending on the characteristics of the color filters used to create RGB pixels. Display 400 also incorporates the microcavity effect. In this embodiment, the multimodal OLED stack contains three OLED light-emitting units that emit different colors in which each unit is vertically separated from another unit by a CGL where the distance between a reflective surface and the top electrode is constant over the active area. Such an arrangement can be referred to as having "three stacks" because there are three separate light-emitting units, each separated by a CGL.

In display 400, there is a silicon backplane 103 which comprises an array of control circuits as well as necessary components that will supply power to the subpixels according to an input signal. Over the layer 103 with the transistors and control circuitry, there can be an optional planarization layer 105. Over layer 105 (if present), are individual first electrode segments 109 which are connected by electrical contacts 107, which extend through the optional planarization layer to make electrical contact between the individual bottom electrode segments 109 and the control circuitry in layer 103. In this embodiment, the bottom electrode segments 109 have two layers, a reflective layer 109B which is closer to the substrate, and an electrode layer 109A which is closer to the OLED layers. The individual bottom electrode segments 109 are electrically isolated from each other laterally. Over the segmented bottom electrode segments 109 are non-light-emitting OLED layers 111, such as electron- or hole-injection or electron- or hole-transport layers. A red OLED light-generating unit 113 is over OLED layers 111. Layer 115 is a first charge-generation layer (CGL) which lies between and separates the red OLED light-generating unit 113 and a green OLED light-generating unit 117. Over the green light-generating unit 117, there is a second charge-generation layer 119 that lies between and separates the green OLED light-generating unit 117 and a blue OLED light-generating unit 121. Over the blue OLED light-generating unit 121 are non-light-emitting OLED layers 123, such as electron- or hole-transport layers or electron- or hole-injection layers, and semi-transparent top electrode 125. This forms an OLED microcavity 130 that extends from the uppermost surface of reflective surface 109B to the bottommost surface of the semi-transparent top electrode 125, which is also a semi-reflective electrode. The OLED microcavity is protected from the environment by an encapsulation layer 127. In this embodiment, there is a color filter array with color filters 129B, 129G and 129R which filter the multimodal emission generated by the OLED microcavity 130 so that B, G and R light is emitted according to the power supplied to the underlaying electrode segment.

Suitable formulations and materials for such OLED stacks are well known; for example, U.S. Pat. Nos. 7,273,663, 9,379,346, 9,741,957, 9,281,487, US2020/0013978 and U.S. Ser. No. 11/031,577 all describe OLED stacks with multiple stacks of light-emitting OLED units, each separated by intermediate connection layers or charge generation layers. Springer et al, Optics Express, 2 (24), 28131 (2016) reports OLED stacks with 2- and 3-light-emitting units, where each unit has a different color. OLED stacks of up to six light-emitting units have been reported (Spindler et al, "High Brightness OLED Lighting", SID Display Week 2016, San Francisco CA, May 23-27, 2016). Suitable backplanes for such displays are also well known and are commercially available; for example, Cho et al, Journal of Information Display, 20(4), 249-255, 2019; https://www.ravepubs.com/oled-silicon-come-new-joint-venture/, published 2018; and Xiao, "Recent Developments in Tandem White Organic Light-Emitting Diodes", Molecules, 24, 151 (2019).

Application of crosstalk reduction methods is particularly useful for OLED displays with a threshold voltage $V_{th}$ of 5V or greater. Such higher voltage OLEDs have increased luminance, but the high voltage also promotes the generation of carrier migration within a pixel and so, there can be increased migration to neighboring pixels resulting increased crosstalk via unintended emission. Thus, the color space can be significantly impacted in such displays when a crosstalk reduction method is applied to allow for the most saturated colors to be emitted. The threshold voltage ($V_{th}$) of the OLED stack can be estimated by linear extrapolation of the I-V curve back to the voltage axis after significant light emission begins. Because this method is not exact because I-V response curves for OLEDs may not be completely linear over their response ranges, values calculated in this manner are not exact. A general range is +/−10%.

The generation of colors within the intermediate region by dithering involves two different colors. However, it is possible to generate intermediate colors by dithering three or more colors together. While it is desirable to dither two colors that lie along the same hue axis, it is also possible that the dithering can involve the selection of a less saturated and more saturated color of different hues and/or of different luminance levels.

It should be noted that any of the described features may be combined in any order or extent without limitation as desired, except when incompatible.

The color images used in FIGS. 3, 5, 6 and 8 are all in the public domain from the sources listed as part of FIG. 3. It should be noted that the visual color effects demonstrated in these Figures will be lost during conversion to B+W images. The original color images are available if needed.

PARTS LIST

R Red
G Green

B Blue
C Cyan
M Magenta
Y Yellow
XT Crosstalk
400 Multimodal OLED
103 Backplane containing transistors and control circuitry
105 Optional planarization layer
107 Electrical contacts
109 First (bottom) electrode segments
109A Electrode layer
109B Reflective layer
111 Non-light emitting OLED layers
113 Red OLED light-generating unit
115 First charge-generation layer (CGL)
117 Green OLED light-generating unit
119 Second charge-generation layer (CGL)
121 Blue OLED light-generating unit
123 Non-light emitting OLED layers
125 Second Semi-transparent (top) electrode
127 Encapsulation layer
130 OLED microcavity
129B, 129G and 129R Color Filter Array

The invention claimed is:

1. A pixelated color display where the emission, according to an image signal, corresponds to a color space comprised of three regions: an outer boundary of the entire color space according to the most saturated colors; an inner region formed by less saturated colors which has an inner region boundary; and between the inner region boundary and the outer boundary, an intermediate region where at least one color is generated by dithering between a most saturated color along the outer boundary and a less saturated color along the inner region boundary or within the inner region;

where each pixel has at least three independently addressed subpixels and the colors within the intermediate region are generated by dithering between a most saturated color where at least one subpixel is below its luminance threshold and a less saturated color where all subpixels have an emission above their luminance threshold, where the luminance threshold corresponds to an image signal of no emission for that subpixel.

2. The display of claim 1 where the dithering is a temporal dithering method involving combining different ratios of the most saturated color and the less saturated color in a pattern over time.

3. The display of claim 2 where the temporal dithering in which colors are combined by alternating emission of the most saturated color for a period of time with the emission of the less saturated color within one single time frame.

4. The display of claim 2 where the temporal dithering in which the most saturated color and the less saturated color are emitted in alternating time frames.

5. The display of claim 4 where the temporal dithering in which the duration of the individual time frame over which the most saturated color and the less saturated color emit differ from each other.

6. The display of claim 1 where the dithering is a spatial dithering method involving color mapping of a color within the intermediate region to either the most saturated color or to the less saturated color.

7. The display of claim 1 where the dithering is a spatial dithering in which colors within the intermediate region are combined in a spatial neighborhood of pixels by placing them in a spatially alternating pattern.

8. The display of claim 1 wherein the most saturated color and the less saturated color lie on the same hue axis.

9. The display of claim 1 wherein the less saturated color used for dithering in the intermediate region is a color located along the inner region boundary.

10. The display of claim 1 wherein the display is an OLED display.

11. The display of claim 10 where the display is a multimodal white light-emitting microcavity OLED with a color filter array and has three or more stacks of light-emitting units.

12. The display of claim 1 where there are three subpixels which emit red, green and blue light or where there are four subpixels which emit red, green, blue and white light.

13. The color display of claim 1, comprising an image controller which, based on the image signal, generates colors within an intermediate region by dithering between the most saturated color, where at least one subpixel is below a luminance threshold, and the less saturated color, where all subpixels have an emission above a luminance threshold.

* * * * *